US010922044B2

(12) United States Patent
Gomes et al.

(10) Patent No.: US 10,922,044 B2
(45) Date of Patent: Feb. 16, 2021

(54) WEARABLE AUDIO DEVICE CAPABILITY DEMONSTRATION

(71) Applicant: Bose Corporation, Framingham, MA (US)

(72) Inventors: Rodrigo Sartorio Gomes, Natick, MA (US); Douglas Warren Young, Arlington, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/204,375

(22) Filed: Nov. 29, 2018

(65) Prior Publication Data
US 2020/0174735 A1  Jun. 4, 2020

(51) Int. Cl.
G06F 3/16 (2006.01)
G10L 21/0208 (2013.01)
H04R 1/10 (2006.01)
G10L 15/22 (2006.01)
G10L 15/08 (2006.01)
H04W 4/80 (2018.01)

(52) U.S. Cl.
CPC .............. G06F 3/165 (2013.01); G10L 15/08 (2013.01); G10L 15/22 (2013.01); G10L 21/0208 (2013.01); H04R 1/10 (2013.01); H04W 4/80 (2018.02); G10L 2015/088 (2013.01); H04R 2420/07 (2013.01)

(58) Field of Classification Search
CPC . G06F 3/16; G06F 3/162; G06F 3/165; G06F 3/167; H04R 1/10; H04R 2420/07; G10L 15/08; G10L 15/22; G10L 2015/088; H04W 4/80
See application file for complete search history.

(56) References Cited

U.S. PATENT DOCUMENTS

| 8,010,366 | B1 * | 8/2011 | Kearby | G09B 21/006 704/271 |
| 9,149,214 | B2 * | 10/2015 | Adachi | A61B 5/04845 |
| 2004/0030556 | A1 * | 2/2004 | Bennett | G06F 40/20 704/270 |
| 2005/0248717 | A1 * | 11/2005 | Howell | G02C 11/06 351/41 |
| 2009/0085873 | A1 | 4/2009 | Betts et al. | |
| 2012/0173187 | A1 * | 7/2012 | Lee | G09B 11/3428 702/123 |

(Continued)

OTHER PUBLICATIONS

Bragi Dash Pro website with link to demonstration video, available at: https://bragi.com/products/thedashpro (accessed on Nov. 29, 2018).

(Continued)

*Primary Examiner* — Andrew C Flanders
(74) *Attorney, Agent, or Firm* — Hoffman Warnick LLC

(57) ABSTRACT

Various implementations include approaches for demonstrating device capabilities in a wearable audio device. In certain cases, these approaches include initiating a demonstration using the wearable audio device to provide the user with an example of the device capabilities. In particular aspects, the wearable audio device is configured to apply acoustic demonstration settings at the wearable audio device based upon the demonstration mode, and output an acoustic signal for playback at the wearable audio device.

25 Claims, 6 Drawing Sheets

(56) References Cited

U.S. PATENT DOCUMENTS

| | | | |
|---|---|---|---|
| 2012/0209601 A1* | 8/2012 | Jing | H03G 3/32 704/226 |
| 2013/0108994 A1* | 5/2013 | Srinivasa | G06F 40/55 434/156 |
| 2013/0300648 A1* | 11/2013 | Kim | G06F 3/013 345/156 |
| 2014/0081631 A1* | 3/2014 | Zhu | G10L 21/0208 704/226 |
| 2015/0248879 A1 | 9/2015 | Miskimen et al. | |
| 2015/0281853 A1* | 10/2015 | Eisner | H04R 25/505 381/312 |
| 2015/0317125 A1 | 11/2015 | Jones et al. | |
| 2016/0112817 A1* | 4/2016 | Fan | H04R 3/005 381/94.7 |
| 2016/0189565 A1* | 6/2016 | Rot | H04L 65/1069 434/185 |
| 2016/0210872 A1* | 7/2016 | Roberts | G09B 5/04 |
| 2016/0301807 A1* | 10/2016 | Webb | H04R 1/083 |
| 2016/0381453 A1* | 12/2016 | Ushakov | H04R 1/1066 381/71.6 |
| 2017/0076738 A1* | 3/2017 | Freudenthal | G10L 21/0388 |
| 2017/0099380 A1* | 4/2017 | Lee | H03G 5/025 |
| 2018/0035216 A1* | 2/2018 | Van Hasselt | A61B 5/6898 |
| 2019/0035397 A1 | 1/2019 | Reily et al. | |
| 2019/0035399 A1 | 1/2019 | Chakladar et al. | |

OTHER PUBLICATIONS

Dash Pro Showreel, available at: https://www.youtube.com/watch?v=jH9likHtoTA (accessed on Nov. 29, 2018).

Starkey Sound Demo website, available at: https://www.starkey.com/sound-demo/st/en/index.html#page/4 (accessed on Nov. 29, 2018).

U.S. Appl. No. 16/274,648 Office Action dated Apr. 7, 2020, 13 pages.

U.S. Appl. No. 16/204,339 Office Action dated Jun. 11, 2020, 8 pages.

* cited by examiner

WEARABLE AUDIO DEVICE CAPABILITY DEMONSTRATION

TECHNICAL FIELD

This disclosure generally relates to audio devices. More particularly, the disclosure relates to demonstrating capabilities of wearable audio devices.

BACKGROUND

Modern wearable audio devices include various capabilities that can enhance the user experience. However, many of these capabilities go unrealized or under-utilized by the user due to inexperience with the device functions and/or lack of knowledge of the device capabilities.

SUMMARY

All examples and features mentioned below can be combined in any technically possible way.

Various implementations include approaches for demonstrating device capabilities in a wearable audio device. In certain cases, these approaches include initiating a demonstration using the wearable audio device to provide the user with an example of the device capabilities.

In some particular aspects, a computer-implemented method includes: initiating a demonstration mode in a wearable audio device paired with a separate audio playback device; receiving a user command via an interface to demonstrate an acoustic feature of the wearable audio device; detecting an acoustic signal at the wearable audio device; applying acoustic demonstration settings at the wearable audio device based upon the demonstration mode; and outputting an acoustic signal for playback at the wearable audio device.

In other particular aspects, a wearable audio device includes: an acoustic transducer for providing audio playback to a user; a communications module for establishing a communications connection with a separate audio playback device; and a control circuit coupled with the acoustic transducer and the communications module, the control circuit configured to control a demonstration mode in the wearable audio device by: instructing the separate audio playback device to playback a demonstration audio file on a delay; disconnecting an established communications connection between the communications module and the audio playback device prior to initiation of the playback at the audio playback device; and detecting acoustic signals including the playback of the demonstration audio file after disconnecting the established communications connection between the communications module and the audio playback device.

In additional particular aspects, a computer-implemented method performed at an audio playback device includes: receiving a command to playback a demonstration audio file; disconnecting an established communications connection between the audio playback device and a separate wearable audio device; and initiating playback of the demonstration audio file for detection by the wearable audio device after disconnecting the established communications connection.

In other particular aspects, a wearable audio device includes: an acoustic transducer for providing audio playback to a user; a communications module for establishing a connection with a separate audio playback device; and a control circuit coupled with the acoustic transducer and the communications module, the control circuit configured to: initiate a demonstration mode in the wearable audio device paired with the audio playback device; receive a user command via an interface to demonstrate an acoustic feature of the wearable audio device; detect an acoustic signal at the wearable audio device; apply acoustic demonstration settings at the wearable audio device based upon the demonstration mode; and output an acoustic signal for playback at the wearable audio device.

In additional particular aspects, a computer-implemented method of controlling a demonstration mode in a wearable audio device includes: instructing a separate audio playback device to playback a demonstration audio file on a delay; disconnecting an established communications connection between the wearable audio device and the audio playback device prior to initiation of the playback at the audio playback device; and detecting acoustic signals including the playback of the demonstration audio file after disconnecting the established communications connection between the communications module and the audio playback device.

In other particular aspects, a computer-implemented method includes: initiating a demonstration mode in a wearable audio device paired with a separate audio playback device; receiving a user command via an interface to demonstrate an acoustic feature of the wearable audio device; detecting a biometric signal about a user at the wearable audio device; and adjusting audio playback at the wearable audio device according to the detected biometric signal and settings in the demonstration mode.

In additional particular aspects, a computer-implemented method includes: initiating a demonstration mode in a wearable audio device; detecting a first acoustic signal at the wearable audio device; processing the first acoustic signal according to acoustic demonstration settings at the wearable audio device based upon the demonstration mode, wherein the processing generates a second acoustic signal; and outputting the second acoustic signal for playback at the wearable audio device.

In other particular aspects, a wearable audio device includes: an acoustic transducer for providing audio playback to a user; a communications module for establishing a connection with a separate audio playback device; and a control circuit coupled with the acoustic transducer and the communications module, the control circuit configured to: initiate a demonstration mode in the wearable audio device; detect a first acoustic signal at the wearable audio device; process the first acoustic signal according to acoustic demonstration settings at the wearable audio device based upon the demonstration mode, wherein the processing generates a second acoustic signal; and output the second acoustic signal for playback at the wearable audio device.

In further particular aspects, a wearable audio device includes: an acoustic transducer for providing audio playback to a user; and a control circuit coupled with the acoustic transducer, the control circuit configured to: detect a location of the wearable audio device; identify audio augmented reality (AR) information associated with the detected location; initiate a demonstration mode in the wearable audio device; process the audio AR information according to audio AR demonstration settings at the wearable audio device based upon the demonstration mode; and output an acoustic signal based on the processed audio AR information.

In additional particular aspects, a wearable audio device includes: an acoustic transducer for providing audio playback to a user; a sensor system having one or more microphones; a communications module for establishing a connection with a separate audio playback device; and a control circuit coupled with the acoustic transducer, the sensor system and the communications module, the control circuit configured to: initiate a demonstration mode in the wearable audio device connected with a separate audio playback device; initiate playback of demonstration audio at the audio playback device; prompt a user to speak during the playback of the demonstration audio; detect a first acoustic signal comprising the user's speech and the demonstration audio at the wearable audio device; process the first acoustic signal according to acoustic demonstration settings at the wearable audio device based upon the demonstration mode, wherein the processing generates a second acoustic signal; and output the second acoustic signal for playback at the wearable audio device.

Implementations may include one of the following features, or any combination thereof.

In certain cases, the method further includes initiating playback of audio from the audio playback device in response to the user command.

In particular aspects, where applying the audio settings includes applying at least one filter, the filter is applied to the detected acoustic signal based upon detected characteristics of the acoustic environment proximate the wearable audio device, where the characteristics of the acoustic environment are detected by a sensor system at the wearable audio device.

In some implementations, the interface includes at least one of a voice interface or a tactile interface at the wearable audio device or the audio playback device.

In certain aspects, the method further includes, in response to receiving the user command to demonstrate an acoustic feature of the wearable audio device; initiating playback of demonstration audio at the audio playback device.

In some cases, the method further includes prompting a user to speak during the playback of the demonstration audio; detecting an acoustic signal associated with the user's speech; applying at least one filter to the detected acoustic signal associated with the user's speech to generate a filtered acoustic signal associated with the user's speech; and outputting the filtered acoustic signal associated with the user's speech for playback to the user.

In certain aspects, the demonstration audio includes simulated noise.

In some aspects, the detected acoustic signal includes an ambient noise signal, and in response to receiving the user command to demonstrate an acoustic feature of the wearable audio device, the method further includes: prompting a user to speak during the detecting of the acoustic noise signal; adjusting a number of microphones for detecting an acoustic signal associated with the user's speech according to the settings in the demonstration mode; detecting the acoustic signal associated with the user's speech; and outputting an acoustic signal associated with the user's speech for playback to the user.

In particular implementations, the method further includes, in response to receiving the user command to demonstrate an acoustic feature of the wearable audio device; initiating playback of demonstration audio at the audio playback device; and applying a set of distinct controllable noise cancelling (CNC) filters, in a sequence, to the acoustic signal received at the wearable audio device, to demonstrate distinct CNC capabilities of the wearable audio device.

In some cases, the demonstration mode includes an augmented reality (AR) demonstration mode, and applying the acoustic demonstration mode settings to the detected acoustic signal includes overlaying AR playback with the playback from the detected acoustic signal.

In certain implementations, the demonstration mode includes a voice pickup demonstration mode, where the acoustic signal detected at the wearable audio device includes voice signals from a user, and the playback of the detected acoustic signal includes an audio representation of the voice signals as detected by at least one microphone at the wearable audio device.

In particular aspects, the delayed playback of the demonstration audio file is controlled by a clock timer on the audio playback device.

In certain cases, the communications module includes a Bluetooth (BT) module, and the delay is controlled by a custom protocol command received from the audio playback device.

In some implementations, disconnecting the established communications connection and initiating playback of the demonstration audio file permits playback of the demonstration audio file at the audio playback device independently of the wearable audio device.

In particular cases, the control circuit is further configured to reestablish a communications connection between the communications module and the separate audio playback device after playback of the demonstration audio file.

In some implementations, the wearable audio device further includes an active noise reduction (ANR) circuit coupled with the acoustic transducer for filtering the audio playback according to ANR settings.

In particular aspects, the established communications connection includes a Bluetooth (BT) connection between a BT module in the wearable audio device and a BT module in the audio playback device.

In some cases, the method further includes reestablishing a communications connection between the audio playback device and the wearable audio device after playback of the demonstration audio file.

In certain implementations, disconnecting the established communications connection and initiating playback of the demonstration audio file is controlled by a delay to permit playback of the demonstration audio file at the audio playback device independently of the wearable audio device.

In particular aspects, the established communications connection includes an established Bluetooth (BT) connection, and the delay is controlled by a custom protocol command from the audio playback device to the wearable audio device.

In some implementations, the method further includes sending custom protocol commands to the wearable audio device and receiving custom protocol commands from the wearable audio device to determine when the playback of the demonstration audio file has concluded.

In certain cases, an active noise reduction (ANR) circuit coupled with the acoustic transducer is configured to filter the audio playback according to the settings in the demonstration mode.

In some aspects, the control circuit is further configured to initiate playback of audio from the audio playback device in response to the user command.

In particular implementations, the wearable audio device further includes a sensor system coupled with the control circuit and configured to detect characteristics of the acoustic environment proximate the wearable audio device, where the control circuit is further configured to apply at least one filter to the detected acoustic signal based upon the detected characteristics of the acoustic environment.

In certain aspects, the interface includes at least one of a voice interface or a tactile interface at the wearable audio device or the audio playback device.

In some cases, the control circuit is further configured to: instruct the audio playback device to initiate playback of demonstration audio in response to receiving the user command to demonstrate an acoustic feature of the wearable audio device.

In certain aspects, the control circuit is further configured to: prompt a user to speak during the playback of the demonstration audio; detect an acoustic signal associated with the user's speech; apply at least one filter to the detected acoustic signal associated with the user's speech to generate a filtered acoustic signal associated with the user's speech; and output the filtered acoustic signal associated with the user's speech for playback to the user.

In particular cases, the control circuit is further configured, in response to receiving the user command to demonstrate an acoustic feature of the wearable audio device, to: instruct the audio playback device to initiate playback of demonstration audio at the audio playback device; and apply a set of distinct controllable noise cancelling (CNC) filters, in a sequence, to the acoustic signal received at the wearable audio device, to demonstrate distinct CNC capabilities of the wearable audio device.

In some implementations, the demonstration mode includes an augmented reality (AR) demonstration mode, and the method further includes overlaying AR playback with playback of the acoustic signal.

In certain aspects, the demonstration mode includes a voice pickup demonstration mode, the signal detected at the wearable audio device includes voice signals from a user, and the playback of the detected acoustic signal includes an audio representation of the voice signals as detected by at least one microphone at the wearable audio device.

In some cases, the communications connection between the wearable audio device and the audio playback device includes a Bluetooth (BT) connection, and the delay is controlled by a custom protocol command received from the audio playback device.

In certain aspects, disconnecting the established communications connection and initiating playback of the demonstration audio file is controlled by the delay to permit playback of the demonstration audio file at the audio playback device independently of the wearable audio device.

In particular implementations, the method further includes reestablishing a communications connection between the wearable audio device and the audio playback device after playback of the demonstration audio file.

In certain cases, the demonstration mode is initiated in response to receiving a user command via an interface to demonstrate an acoustic feature of the wearable audio device.

In some implementations, processing the first acoustic signal according to the acoustic demonstration settings include applying at least one filter to the first acoustic signal.

In particular aspects, one or more microphones is used to detect the first acoustic signal at the wearable audio device, and processing the first acoustic signal according to the acoustic demonstration settings includes modifying the number of microphones used to detect the first acoustic signal.

In some cases, processing the first acoustic signal according to the acoustic demonstration settings includes selecting a signal processing algorithm to apply to the first acoustic signal.

In certain implementations, the method further includes: prompting a user to speak during the detecting of the first acoustic signal; adjusting a number of microphones for detecting an acoustic signal associated with the user's speech according to the settings in the demonstration mode; detecting the acoustic signal associated with the user's speech using the adjusted number of microphones; processing the acoustic signal associated with the user's speech to generate a voice signal; and outputting the voice signal for playback to the user.

In particular aspects, the method further includes: prompting a user to speak during the detecting of the first acoustic signal; adjusting a signal processing algorithm used for detecting an acoustic signal associated with the user's speech, according to the settings in the demonstration mode; detecting the acoustic signal associated with the user's speech; processing the acoustic signal associated with the user's speech to generate a voice signal; and outputting the voice signal for playback to the user.

In some cases, the demonstration mode includes a controllable noise cancelling (CNC) demonstration mode, the detected acoustic signal includes an ambient noise signal at the wearable audio device, processing the ambient noise signal includes applying a set of distinct CNC filters, in a sequence, to the ambient noise signal received at the wearable audio device, to generate processed ambient noise signals, and outputting a second acoustic signal for playback at the wearable audio device includes outputting the processed ambient noise signals.

In particular aspects, the method further includes detecting a biometric signal about a user at the wearable audio device, where the acoustic demonstration settings are selected based upon the detected biometric signal.

In certain implementations, the demonstration mode includes a voice pickup demonstration mode, the first acoustic signal detected at the wearable audio device includes voice signals from a user of the wearable audio device, processing the detected voice signals according to the acoustic demonstration settings includes applying at least one filter to the voice signals to generate processed voice signals, and outputting the second acoustic signal for playback at the wearable audio device includes outputting the processed voice signals.

In some cases, processing the detected voice signals according to the acoustic demonstration settings in the voice pickup demonstration mode includes applying two distinct processing approaches to the detected voice signals, where the two distinct processing approaches include a first processing approach and a second processing approach, and outputting the second acoustic signal for playback at the wearable audio device includes sequentially outputting acoustic signals processed using the first processing approach and acoustic signals processed using the second processing approach.

In certain aspects, the control circuit is further configured to: detect a first acoustic signal at the wearable audio device, where outputting the acoustic signal based on the processed audio AR information includes overlaying AR playback with playback of the detected first acoustic signal.

In particular implementations, the control circuit is further configured to apply a filter to the detected first acoustic signal for output with the overlayed AR playback.

In some cases, the AR information includes navigation information, and the AR playback includes navigation directions for a user of the wearable audio device based upon the AR information.

In certain implementations, the AR playback includes an audio pin or an audio cache associated with the location.

In particular aspects, the demonstration audio includes simulated noise.

In some cases, processing the first acoustic signal includes adjusting a number of microphones or a configuration of microphones used to detect the first acoustic signal.

In particular aspects, the control circuit is further configured to apply one or more filters to the first acoustic signal, where the one or more filters include specific frequency bands for voice signals so as to enhance or diminish effects of the user's speech on the playback at the wearable audio device.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
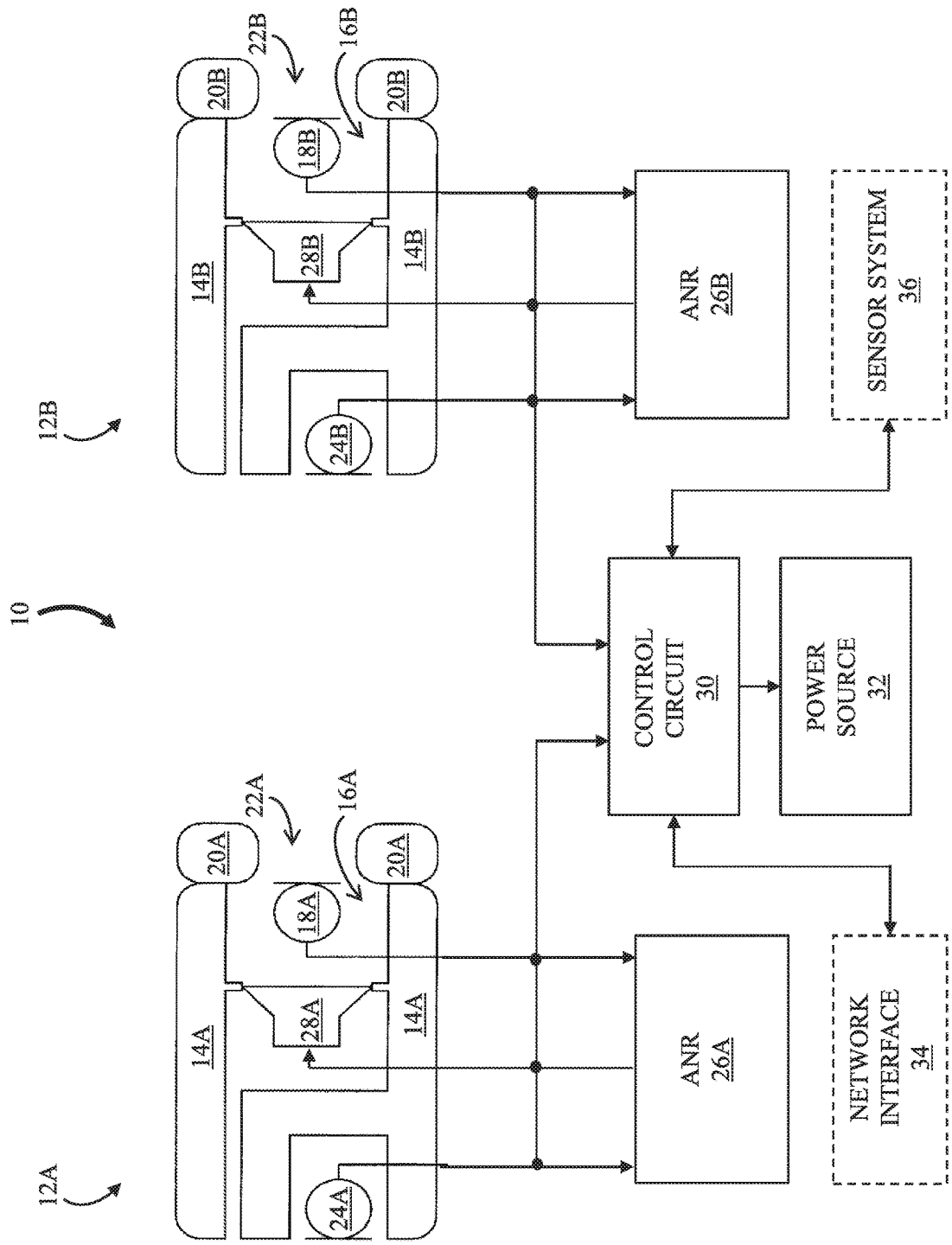
FIG. 1 is a block diagram depicting an example personal audio device according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that features in a wearable audio device can be beneficially demonstrated to a user. For example, a wearable audio device can be configured to demonstrate various features according to an initiated demonstration mode. In other cases, the wearable audio device is configured to control its connection with a separate audio playback device to facilitate the demonstration.

Commonly labeled components in the FIGURES are considered to be substantially equivalent components for the purposes of illustration, and redundant discussion of those components is omitted for clarity.

In contrast to conventional wearable audio devices, various implementations include wearable audio devices configured for a user with a software module or mobile application that permits the user to demonstrate various device functions. The approaches described according to various implementations utilize a separate audio playback device to aid in demonstrating device functions on the wearable audio device. In particular approaches, the wearable audio device and/or the separate audio playback device can control the demonstration and communications between the devices during the demonstration. As described herein, the separate audio playback device can include a smart device such as a smart phone, tablet, PC, etc., or any other connected playback device such as a fixed or portable speaker system, a home entertainment audio system, a vehicle audio system, etc.

It has become commonplace for those who either listen to electronically provided audio (e.g., audio from an audio source such as a mobile phone, tablet, computer, CD player, radio or MP3 player), those who simply seek to be acoustically isolated from unwanted or possibly harmful sounds in a given environment, and those engaging in two-way communications to employ personal audio devices to perform these functions. For those who employ headphones or headset forms of personal audio devices to listen to electronically provided audio, it is commonplace for that audio to be provided with at least two audio channels (e.g., stereo audio with left and right channels) to be separately acoustically output with separate earpieces to each ear. For those simply seeking to be acoustically isolated from unwanted or possibly harmful sounds, it has become commonplace for acoustic isolation to be achieved through the use of active noise reduction (ANR) techniques based on the acoustic output of anti-noise sounds in addition to passive noise reduction (PNR) techniques based on sound absorbing and/or reflecting materials. Further, it is commonplace to combine ANR with other audio functions in headphones, such as conversation enhancing functions. While the term ANR is used to refer to acoustic output of anti-noise sounds, this term can also include controllable noise canceling (CNC), which permits control of the level of anti-noise output, for example, by a user. In some examples, CNC can permit a user to control the volume of audio output regardless of the ambient acoustic volume.

Aspects and implementations disclosed herein may be applicable to a wide variety of personal audio devices, such as wearable audio devices in various form factors, such as watches, glasses, neck-worn speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones, audio eyeglasses, head-worn audio devices and various other types of personal audio devices such as shoulder or body-worn acoustic devices that include one or more acoustic drivers to produce sound without contacting the ears of a user. It should be noted that although specific implementations of personal audio devices primarily serving the purpose of acoustically outputting audio are presented with some degree of detail, such presentations of specific implementations are intended to facilitate understanding through provision of examples, and should not be taken as limiting either the scope of disclosure or the scope of claim coverage.

Aspects and implementations disclosed herein may be applicable to personal audio devices that either do or do not support two-way communications, and either do or do not support active noise reduction (ANR). For personal audio devices that do support either two-way communications or ANR, it is intended that what is disclosed and claimed herein is applicable to a personal audio device incorporating one or more microphones disposed on a portion of the personal audio device that remains outside an ear when in use (e.g., feedforward microphones), on a portion that is inserted into a portion of an ear when in use (e.g., feedback microphones), or disposed on both of such portions. Still other implementations of personal audio devices to which what is disclosed and what is claimed herein is applicable will be apparent to those skilled in the art.

FIG. 1 is a block diagram of an example of a personal audio device 10 (e.g., a wearable audio device) having two earpieces 12A and 12B, each configured to direct sound towards an ear of a user. Features of the personal audio device 10 can be particularly useful as a wearable audio device, e.g., a head and/or shoulder-worn conversation assistance device. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. An ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include ANR (which may include CNC), the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24, and performs an ANR process for the corresponding earpiece 12. The process includes providing a signal to an electroacoustic transducer (e.g., speaker) 28 disposed in the cavity 16 to generate an anti-noise acoustic signal that reduces or substantially prevents sound from one or more acoustic noise sources that are external to the earphone 12 from being heard by the user. As described herein, in addition to providing an anti-noise acoustic signal, electroacoustic transducer 28 can utilize its sound-radiating surface for providing an audio output for playback. e.g., for a continuous audio feed.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP) and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback may be initiated, paused or resumed, a notification to a wearer may be provided or altered, and a device in communication with the personal audio device may be controlled. The personal audio device 10 also includes a power source 32. The control circuit 30 and power source 32 may be in one or both of the earpieces 12 or may be in a separate housing in communication with the earpieces 12. The personal audio device 10 may also include a network interface 34 to provide communication between the personal audio device 10 and one or more audio sources and other personal audio devices. The network interface 34 may be wired (e.g., Ethernet) or wireless (e.g., employ a wireless communication protocol such as IEEE 802.11. Bluetooth. Bluetooth Low Energy (BLE), or other local area network (LAN) or personal area network (PAN) protocols).

Network interface 34 is shown in phantom, as portions of the interface 34 may be located remotely from personal audio device 10. The network interface 34 can provide for communication between the personal audio device 10, audio sources and/or other networked (e.g., wireless) speaker packages and/or other audio playback devices via one or more communications protocols. The network interface 34 may provide either or both of a wireless interface and a wired interface. The wireless interface can allow the personal audio device 10 to communicate wirelessly with other devices in accordance with any communication protocol noted herein. In some particular cases, a wired interface can be used to provide network interface functions via a wired (e.g., Ethernet) connection.

In some cases, the network interface 34 may also include a network media processor for supporting, e.g., Apple AirPlay® (a proprietary protocol stack/suite developed by Apple Inc., with headquarters in Cupertino. Calif., that allows wireless streaming of audio, video, and photos, together with related metadata between devices) or other known wireless streaming services (e.g., an Internet music service such as: Pandora®, a radio station provided by Pandora Media, Inc. of Oakland. Calif., USA; Spotify®, provided by Spotify USA, Inc., of New York, N.Y., USA); or vTuner®, provided by vTuner.com of New York. N.Y. USA); and network-attached storage (NAS) devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor through (e.g., through a USB bridge) to the control circuit 30. As noted herein, in some cases, control circuit 30 can include a processor and/or microcontroller, which can include decoders, DSP hardware/software. etc. for playing back (rendering) audio content at electroacoustic transducers 28. In some cases, network interface 34 can also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor or microcontroller. The control circuit 30 can execute instructions (e.g., for performing, among other things, digital signal processing, decoding, and equalization functions), including instructions stored in a corresponding memory (which may be internal to control circuit 30 or accessible via network interface 34) or other network connection (e.g., cloud-based connection). The control circuit 30 may be implemented as a chipset of chips that include separate and multiple analog and digital processors. The control circuit 30 may provide, for example, for coordination of other components of the personal audio device 10, such as control of user interfaces (not shown) and applications run by the personal audio device 10.

In implementations of the personal audio device 10 having an ANR circuit 26, that ANR circuit 26 can also include one or more digital-to-analog (D/A) converters for converting the digital audio signal to an analog audio signal. This audio hardware can also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices. However, in additional implementations of the personal audio device 10 that do not include an ANR circuit 26, these D/A converters, amplifiers and associated circuitry can be located in the control circuit 30.

The memory in control circuit 30 can include, for example, flash memory and/or non-volatile random access memory (NVRAM). In some implementations, instructions (e.g., software) are stored in an information carrier. The instructions, when executed by one or more processing devices (e.g., the processor or microcontroller in control circuit 30), perform one or more processes, such as those described elsewhere herein. The instructions can also be stored by one or more storage devices, such as one or more (e.g. non-transitory) computer- or machine-readable mediums (for example, the memory, or memory on the processor/microcontroller). As described herein, the control circuit 30 (e.g., memory, or memory on the processor/microcontroller) can include a control system including instructions for controlling audio demonstration functions according to various particular implementations. It is understood that portions of the control system (e.g., instructions) could also be stored in a remote location or in a distributed location, and could be fetched or otherwise obtained by the control circuit 30 (e.g., via any communications protocol described herein) for execution. The instructions may include instructions for controlling audio demonstration functions, as well as digital signal processing and equalization. Additional details may be found in U.S. Patent Application Publication 20140277644, U.S. Patent Application Publication 20170098466, and U.S. Patent Application Publication 20140277639, the disclosures of which are incorporated here by reference in their entirety.

Personal audio device 10 can also include a sensor system 36 coupled with control circuit 30 for detecting one or more conditions of the environment proximate personal audio device 10. Sensor system 36 can include one or more local sensors (e.g., inner microphones 18 and/or outer microphones 24) and/or remote or otherwise wireless (or hardwired) sensors for detecting conditions of the environment proximate personal audio device 10 as described herein. As described further herein, sensor system 36 can include a plurality of distinct sensor types for detecting conditions proximate the personal audio device 10.

According to various implementations, the wearable audio devices (which may be, for example, personal audio device 10 of FIG. 1) described herein can be configured to demonstrate various functions in conjunction with a separate audio playback device (e.g., a speaker in a separate device). These particular implementations can allow a user to experience functions of the wearable audio device that may otherwise go unnoticed or under-utilized. These implementations can enhance the user experience in comparison to conventional wearable audio devices.

Figure 2:
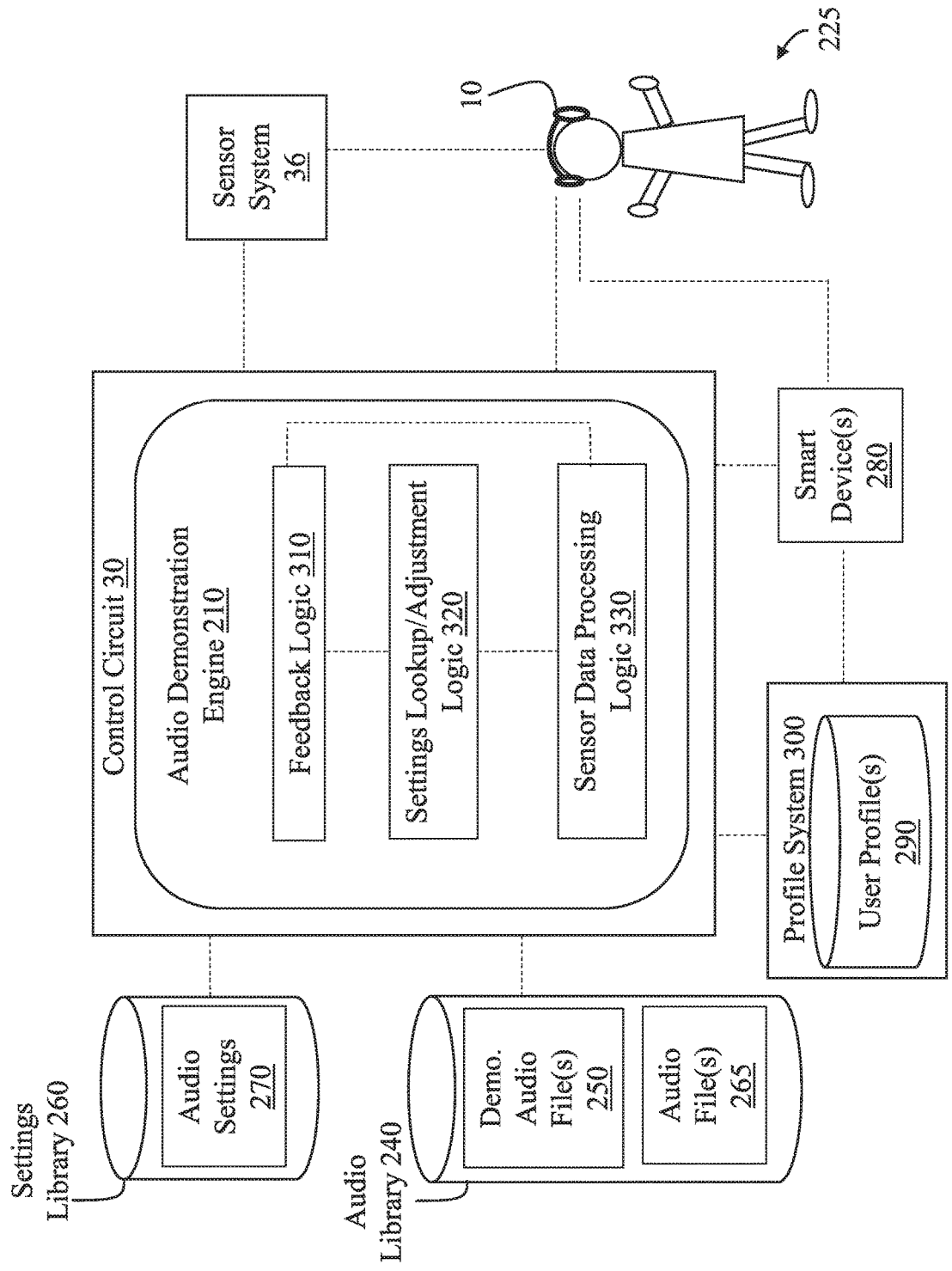
FIG. 2 is a schematic data flow diagram illustrating control processes performed by an audio demonstration engine in the personal audio device of FIG. 1.

As described with respect to FIG. 1, control circuit 30 can execute (and in some cases store) instructions for controlling audio functions in personal audio device 10 and/or a smart device coupled with the personal audio device 10 (e.g., in a network). As shown in FIG. 2, control circuit 30 can include an audio demonstration engine 210 configured to implement demonstrations of various acoustic-related features of the personal audio device 10. Additionally, one or more portions of the audio demonstration engine 210 (e.g., software code and/or logic infrastructure) can be stored on or otherwise accessible to one or more smart devices 280, which may be connected with the control circuit 30 by any communications connection described herein. As described herein, particular functions of the audio demonstration engine 210 can be beneficially employed on the smart device(s) 280. In various particular implementations, the smart device(s) 280 can include a separate audio playback device, such as a conventional speaker, and can include a network interface or other communications module for communicating with the control circuit 30 on the personal audio device 10.

Figure 3:
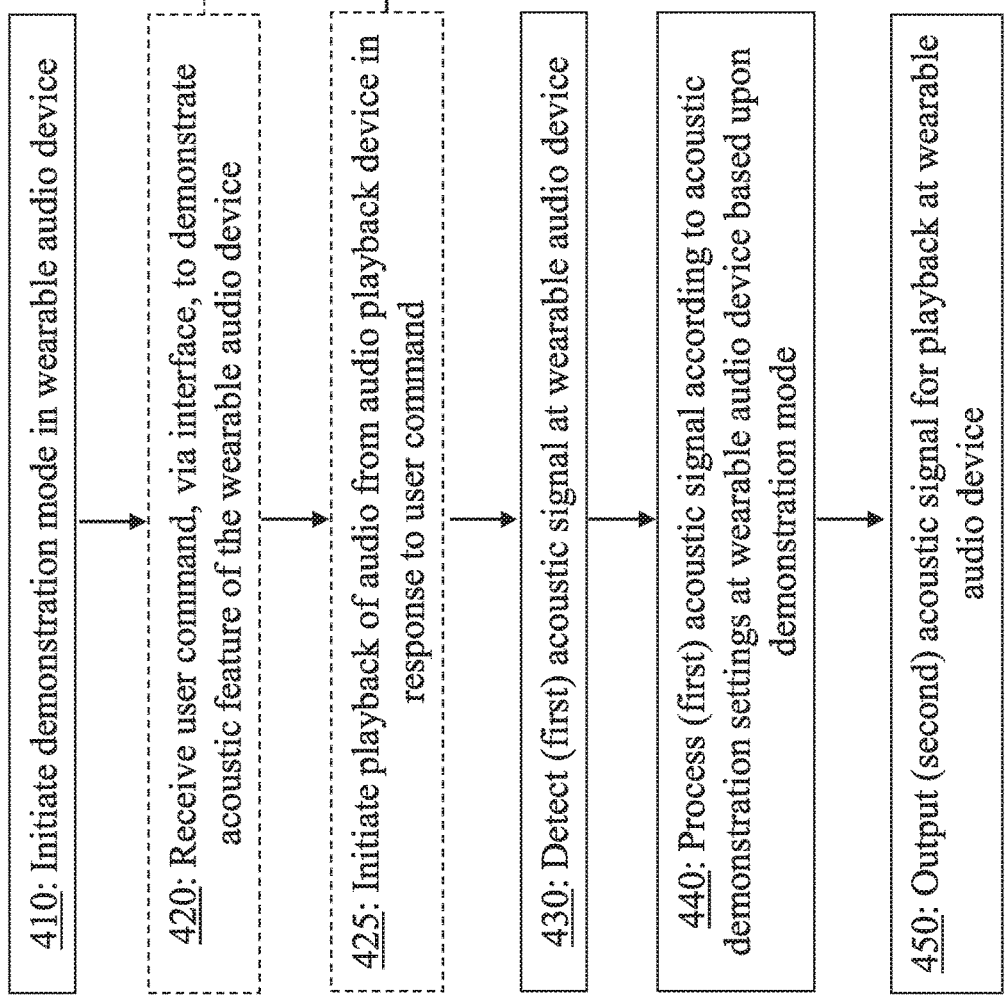
FIG. 3 is a process flow diagram illustrating processes performed by the audio demonstration engine shown in FIG. 2.

In particular, FIG. 2 shows a schematic data flow diagram illustrating a control process performed by audio demonstration engine 210 in connection with a user 225. It is understood that in various implementations, user 225 can include a human user. FIG. 3 shows a process flow diagram illustrating processes performed by audio demonstration engine 210 according to various implementations. FIGS. 2 and 3 are referred to simultaneously.

Returning to FIG. 2, data flows between audio demonstration engine 210 and other components in personal audio device 10 are shown. It is understood that one or more components shown in the data flow diagram may be integrated in the same physical housing, e.g., in the housing of personal audio device 10, or may reside in one or more separate physical locations.

Audio demonstration engine 210 can be coupled (e.g., wirelessly and/or via hardwired connections in personal audio device 10) with an audio library 240, which can include demonstration audio files 250 for playback (e.g., streaming) at personal audio device 10 and/or another audio playback device, e.g., smart device(s) 280, along with stored audio files 265 for identifying acoustic sources.

Audio library 240 can be associated with digital audio sources accessible via network interface 34 (FIG. 1) described herein, including locally stored, remotely stored or Internet-based audio libraries. Demonstration audio files 250 are configured for playback at the smart device 280 and/or the personal audio device 10 to aid in demonstrating various functions of the personal audio device 10. In some particular cases, demonstration audio files 250 can include playback of simulated noise (e.g., crowd noise, machine noise, airplane or other vehicle noise).

In some particular implementations, the demonstration audio file(s) 250 can also include a video file (or be paired with a corresponding video file) for playback on an interface (e.g., an interface on a smart device 280 and/or on the personal audio device 10). The video file can be synchronized with the audio playback at the smart device 280 and/or personal audio device 10 to provide the user 225 with an immersive demonstration experience. Playback of the audio and/or video can be controlled by the control circuit 30 and/or a processing component on a paired smart device 280. Content can be stored locally to the personal audio device 10, stored locally on the smart device 280 and streamed to the personal audio device 10, or streamed from a cloud service to the smart device 280, which in turn streams the content to the personal audio device 10. Content can also be dynamically stored and synched between the personal audio device 10, smart device 280 and the cloud at runtime.

Audio demonstration engine 210 can also be coupled with a settings library 260 for controlling audio setting(s) on the personal audio device 10. The settings library 260 can include a group of audio settings 270 for applying different modifications to incoming acoustic signals received at the personal audio device 10. As described herein, the settings 270 can be adjusted based upon the particular demonstration mode selected for a device feature. In certain cases, adjusting the audio settings 270 in the personal audio device can include adjusting one or more of: a directivity of a microphone array in the personal audio device 10, a microphone array filter on the microphone array in the personal audio device 10, a volume of audio provided to the user 225 at the personal audio device 10, parameters controlling wide dynamic range compression gain parameters controlling the shape of the frequency versus gain function, a number of microphones used in the array. ANR or awareness settings, self-voice parameters, or processing applied to one or more microphone inputs (e.g., as described in U.S. patent application Ser. No. 15/627,905, filed Jun. 20, 2017, titled "Audio Device with Wakeup Word Detection" and U.S. patent application Ser. No. 15/463,368, filed Mar. 20, 2017, titled "Audio Signal Processing for Noise Reduction, each of which is herein incorporated by reference in its entirety.

As noted herein, audio demonstration engine 210 can also be coupled with smart device 280. In some cases, smart device 280 can have access to one or more user profiles 290 (e.g., in a profile system 300) or biometric information about user 225, however, this access is not required in all instances. It is understood that smart device 280 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. In various particular implementations, the smart device 280 can include an audio playback device, for example, a speaker and a control circuit for providing audio output. Various smart devices include such audio playback devices. In some implementations, the smart device 280 can include a conventional user interface for permitting interaction with user 225, and can include one or more network interfaces for interacting with control circuit 30 and other components in personal audio device 10 (FIG. 1). In some example implementations, smart device 280 can be utilized for: connecting personal audio device 10 to a Wi-Fi network; creating a system account for the user 225; setting up music and/or location-based audio services; browsing content for playback; setting preset assignments on the personal audio device 10 or other audio playback devices; transport control (e.g., play/pause, fast forward/rewind, etc.) for the personal audio device 10; selecting one or more personal audio devices 10 for content playback (e.g., single room playback or synchronized multi-room playback); and providing audio playback according to one or more demonstration modes. In some cases smart device 280 may also be used for: music services setup; browsing of content; setting preset assignments on the audio playback devices; transport control of the audio playback devices; and selecting personal audio devices 10 (or other playback devices) for content playback. Smart device 280 can further include embedded sensors for measuring biometric information about user 225, e.g., travel, sleep or exercise patterns; body temperature; heart rate; or pace of gait (e.g., via accelerometer(s)). As noted herein, smart device 280 can be used to play back demonstration audio files 250 to demonstrate functions of the personal audio device 10 to the user 225. Further, it is understood that one or more functions of the audio demonstration engine 210 can be stored, accessed and/or executed at smart device 280.

User profiles 290 may be user-specific, community-specific, device-specific, location-specific or otherwise associated with a particular entity such as user 225. User profiles 290 can include user-defined playlists of digital music files, audio messages stored by the user 225 or another user, or other audio files available from network audio sources coupled with network interface 34 (FIG. 1), such as network-attached storage (NAS) devices, and/or a DLNA server, which may be accessible to the personal audio device 10 (FIG. 1) over a local area network such as a wireless (e.g., Wi-Fi) or wired (e.g., Ethernet) home network, as well as Internet music services such as Pandora®, vTuner®, Spotify®, etc., which are accessible to the personal audio device 10 over a wide area network such as the Internet. In some cases, profile system 300 is located in a local server or a cloud-based server, similar to any such server described herein. User profile 290 may include information about audio settings associated with user 225 or other similar users (e.g., those with common hearing attributes or demographic traits), frequency with which particular audio settings are changed by user 225 or other similar users, etc. Profile system 300 can be associated with any community of users, e.g., a social network, subscription-based music service, and may include audio preferences, histories, etc. for user 225 as well as a plurality of other users. In particular implementations, profile system 300 can include user-specific preferences (as profiles 290) for audio settings 270. Profiles 290 can be customized according to particular user preferences, or can be shared by users with common attributes.

Audio demonstration engine 210 is also configured to receive sensor data from sensor system 36. Additionally, as noted herein, the audio demonstration engine 210 can receive sensor data from the smart device 280. This sensor data can be used to control various functions such as ANR (and CNC) functions, dynamic volume control, the number and processing applied to any microphones used to detect speech of the user, notifications, etc. In some cases, sensor system 36 can include one or more of the following sensors; a position tracking system; an accelerometer/gyroscope/magnetometer; one or more biometric sensors (e.g., a heart rate sensor, a photoplethysmogram (PPG), electroencephalogram (EEG), electrocardiogram (ECG) or EGO); a microphone (e.g., including one or more microphones, which may include or work in concert with microphones 18 and/or 24); and a wireless transceiver. These sensors are merely examples of sensor types that may be employed according to various implementations. It is further understood that sensor system 36 can deploy these sensors in distinct locations and distinct sub-components in order to detect particular environmental information or biometric information relevant to user 225 and the personal audio device 10.

A position tracking system can include one or more location-based detection systems such as a global positioning system (GPS) location system, a Wi-Fi location system, an infra-red (IR) location system, a Bluetooth beacon system, etc. In various additional implementations, the position tracking system can include an orientation tracking system for tracking the orientation of the user 225 and/or the personal audio device 10. The orientation tracking system can include a head-tracking or body-tracking system (e.g., an optical-based tracking system, accelerometer, magnetometer, gyroscope or radar) for detecting a direction in which the user 225 is facing, as well as movement of the user 225 and the personal audio device 10. The position tracking system can be configured to detect changes in the physical location of the personal audio device 10 and/or user 225 (where user 225 is separated from personal audio device 10) and provide updated sensor data to the audio demonstration engine 210. The position tracking system can also be configured to detect the orientation of the user 225, e.g., a direction of the user's head, or a change in the user's orientation such as a turning of the torso or an about-face movement.

An accelerometer/gyroscope/magnetometer can include distinct accelerometer components and gyroscope components, or could be collectively housed in a single sensor component, e.g., an inertial measurement unit (IMU). This component may be used to sense gestures based on movement of the user's body (e.g., head, torso, limbs) while the user is wearing the personal audio device 10 or interacting with another device (e.g., smart device 280) connected with personal audio device 10. As with any sensor in sensor system 36, the accelerometer/gyroscope/magnetometer may be housed within personal audio device 10 or in another device connected to the personal audio device 10.

The microphone (which can include one or more microphones, or a microphone array) can have similar functionality as the microphone(s) 18 and 24 shown and described with respect to FIG. 1, and may be housed within personal audio device 10 or in another device (e.g., smart device 280) connected to the personal audio device 10. As noted herein, microphone(s) may include or otherwise utilize microphones 18 and 24 to perform functions described herein. Microphone(s) can be positioned to receive ambient acoustic signals (e.g., acoustic signals proximate personal audio device 10). In some cases, these ambient acoustic signals include speech/voice input from user 225 to enable voice control functionality. In some other example implementations, the microphone can detect the voice of user 225 and/or of other users proximate to or interacting with user 225. In particular implementations, audio demonstration engine 210 is configured to analyze one or more voice commands from user 225 (via microphone), and modify the applied audio settings 270 on the personal audio device 10. In some cases, the audio demonstration engine 210 can include sensor data processing logic for analyzing voice commands, including, e.g., natural language processing (NLP) logic or other similar logic.

As noted herein, the sensor system 36 can also include a wireless transceiver (comprising a transmitter and a receiver), which may include, a Bluetooth (BT) or Bluetooth Low Energy (BLE) transceiver or other conventional transceiver device. The wireless transceiver can be configured to communicate with other transceiver devices in distinct components (e.g., smart device 280 or devices belonging to other users).

It is understood that any number of additional sensors could be incorporated in sensor system 36, and could include temperature sensors or humidity sensors for detecting changes in weather within environments, optical/laser-based sensors and/or vision systems for tracking movement or speed, light sensors for detecting time of day, additional audio sensors (e.g., microphones) for detecting human or other user speech or ambient noise, etc.

According to various implementations, control circuit 30 includes the audio demonstration engine 210, or otherwise accesses program code for executing processes performed by audio demonstration engine 210 (e.g., via network interface 34). Audio demonstration engine 210 can include logic for processing feedback from the user 225 about the demonstration modes. Additionally, audio demonstration engine 210 can include logic for looking up and adjusting audio settings according to feedback received from the user 225 and/or known characteristics of the demonstration. The audio demonstration engine 210 can also include logic for processing sensor data from the sensor system 36. e.g., data about ambient acoustic signals from microphones, data about a location of the personal audio device 10, biometric data from a smart device, and/or usage data from a smart device.

As noted herein, audio demonstration engine 210 can include logic for performing audio demonstration functions according to various implementations. FIG. 3 shows a flow diagram illustrating processes in audio demonstration performed by the audio demonstration engine 210 and its associated logic.

As also noted herein, the audio demonstration engine 210 is configured to initiate a demonstration mode in the personal audio device 10 (process 410. FIG. 3). In some cases, the demonstration mode can be initiated by a user command, e.g., by a user command at an interface on the personal audio device 10. In some example implementations, the personal audio device 10 is paired with a separate audio playback device (e.g., smart device 280), and the user command is received at an interface on the personal audio device 10 and/or the smart device 280. However, the personal audio device 10 need not be paired with the separate audio playback device to initiate the demonstration mode. In certain cases, the user 225 can initiate the demonstration mode through a software application (or, app) running on the personal audio device and/or smart device 280. The interface on the smart device 280 and/or personal audio device 10 can include a tactile interface, voice command interface, gesture-based interface and/or any other interface described herein. In some cases, the audio demonstration engine 210 can prompt the user 225 to begin a demonstration process, e.g., using any prompt described herein. In certain implementations, the demonstration mode can be launched via an app or other program running on the smart device 280 and/or personal audio device 10.

In some optional implementations, the audio demonstration engine 210 is also configured to receive a command from the user 225 (e.g., via a voice interface, gesture interface and/or tactile interface on the smart device 280 and/or the personal audio device 10) to demonstrate an acoustic feature of the personal audio device 10 (process 420, FIG. 3, illustrated in phantom as optional). The user command can be made in response to a prompt, e.g., where the audio demonstration engine 210 provides a visual prompt and/or an audio prompt ("Would you like to experience controllable noise cancelling features of your personal audio device?", or "Nod your head or tap twice on your right earphone to initiate a demonstration of the voice pickup functions"). The user can also provide a command without prompting, e.g., a specific user interface command such as a voice command or a capacitive touch interface command.

As described herein, depending upon the demonstration mode selected (corresponding with particular audio settings 270), the audio demonstration engine 210 can take different actions to demonstrate audio features of the personal audio device 10. In some additional optional implementations, in response to the user command, the audio demonstration engine 210 can initiate playback of audio from the separate audio playback device (e.g., smart device 280) (process 425. FIG. 3, shown in phantom as optional). In certain implementations, the demonstration audio played back at the separate audio playback device can include simulated noise.

However, in other implementations, the audio demonstration engine 210 initiates the demonstration mode without providing playback of audio from the separate audio playback device. For this reason, process 425 is shown in phantom. In these cases, the demonstration mode is configured to demonstrate acoustic features of the personal audio device 10 as they relate to data gathered from the sensor system 36 and/or additional microphones on the personal audio device 10 and/or smart device 280.

Regardless of whether the audio playback is provided from the separate audio playback device (e.g., smart device 280), the audio demonstration engine 210 is configured to detect an acoustic signal (or, a "first acoustic signal") at the personal audio device 10 (process 430, FIG. 3). The first acoustic signal can be detected, for example, by microphones (e.g., microphones 24) on the personal audio device 10 and/or microphones on the sensor system 36. It is understood that the detected acoustic signal can include acoustic signals from one or more sources. e.g., demonstration audio, ambient acoustic signals such as other user's voices, music, road noise, etc., and the user's own voice.

In additional implementations, the audio demonstration engine 210 is also configured to detect a biometric signal about the user 225 at the personal audio device 10. The biometric signal can be detected, for example, by biometric sensors such as a heart rate sensor, PPG, EEG, and/or ECG. For example, a heart rate sensor can indicate that the user 225 is exercising, or that the user 225 is fatigued. In these cases, demonstrations can be tailored to the user's current biometric state, e.g., an exercise coaching demo can be applied where the biometric sensor(s) detect biometric signals indicating that the user 225 is exercising.

In some examples, the audio demonstration engine 210 can be configured to process the first acoustic signal according to acoustic demonstration settings at the wearable audio device based upon the demonstration mode (process 440, FIG. 3). In certain cases, a set of filters (in audio settings 270) are applied to the detected acoustic signal(s) according to the demonstration mode settings. In other particular cases, microphone directionality is adjusted to enhance detection of one or more acoustic signals. In any case, processing the first acoustic signal generates a second (processed) acoustic signal.

In particular cases, the detected acoustic signal has an acoustic signature that indicates a characteristic of the source, such as the sound pressure level (SPL) of the source, or the identity of the source. For example, the acoustic signature of the detected acoustic signal can indicate the source of the detected acoustic signal is a voice of the user 225, a voice of another user, a noise source, a notification system or an alert system. In certain cases, the audio demonstration engine 210 can include a voice activity detection and/or recognition circuit for detecting the user's voice and/or differentiating the user's voice from the voice of others in the vicinity. In some cases, the audio demonstration engine 210 can compare the acoustic signature of the detected acoustic signal(s) with stored audio files 265 in audio library 240 (FIG. 2) to detect the characteristic(s) of the source. For example, the stored audio files 265 can include data about acoustic signatures of common notifications or alerts, voice signatures and/or background noises/sounds (e.g., tones, SPL, frequency ranges, frequency response at particular frequency ranges). In some cases, notifications can include non-urgent reminders or indicators of particular events, for example, calendar notifications, email notifications or message notifications. Alerts can include more urgent information such as sirens, alarms or high-pitched sounds.

In various example implementations, in response to the acoustic signature of the detected acoustic signal matching an acoustic signature in the audio library 240 or in response to the acoustic signature of the detected acoustic signature having a predetermined characteristic (e.g., SPL, frequency response, etc.), the audio demonstration engine 210 can apply one or more filters to the signal(s) to enter a demonstration mode. For example, the personal audio device 10 can have a plurality of demonstration modes, such as a playback mode, a focused listening mode, a general listening mode, an ANR mode, a CNC mode, an augmented reality mode (AR), a voice pickup mode, a voice playback mode, etc. The demonstration mode can include ANR and/or CNC functionality to reduce the impact of ambient acoustic signals while the user 225 experiences functions of the personal audio device 10. For example, playback demonstration mode can be desirable when the user 225 is listening to music, a podcast or on a phone call using the personal audio device 10. In playback demonstration mode, the demonstration engine 210 may enable or increase ANR to demonstrate to the user 225 how listening can be improved, especially in noisy environments, by enabling or increasing ANR.

In other example implementations, the acoustic demonstration settings (e.g., audio settings 270) for a particular mode can use microphone array directionality to control the audio output to the user 225. For example, focused listening demonstration mode can use microphone array directionality to focus on one or more areas proximate the user 225 (e.g., based upon acoustic signal sources, as described herein). The user 225 can activate focused listening mode, or it can be activated by the audio demonstration engine 210 based upon sensor inputs (e.g., from sensor system 36). Focused listening mode may employ selective ANR and/or CNC functionality to direct microphones (or apply signal processing for directionalizing microphone inputs) in one or more particular directions. For example, focused listening mode may be beneficial where the user 225 wishes to focus on one sound source in an environment, such as one person speaking in a group, or the sound of a television from across a noisy room.

General listening mode, which may also be called Aware mode or full awareness mode, can essentially permit the user 225 to hear all ambient acoustic signals at approximately their naked-ear decibel level. That is, the general listening mode allows the user 225 to hear unobstructed acoustic signals from the environment. In some particular cases, the general listening mode increases the audibility of the acoustic signals based upon the user's preferred playback level (volume, tone, etc. preferences in audio settings 270), e.g., in order to provide audio playback at the personal audio device 10 at the same level as the received acoustic signals at the outer microphones or an adjusted level based upon user preferences. General listening mode may be beneficial when the user 225 wishes to pause or stop audio playback but does not wish to doff his/her personal audio device 10 (e.g., in the case of headphones), remaining aware of the surrounding acoustic environment.

In other examples, a CNC demonstration mode allows the user 225 to adjust or experience adjusted noise canceling functions on the personal audio device 10 during playback from the separate audio playback device to experience distinct levels of noise canceling. CNC demonstration mode can allow the user 225 to adjust different levels of noise cancellation using one or more interface commands, e.g., by increasing noise cancellation or decreasing noise cancellation across a spectrum. CNC mode can be beneficial when the user 225 is in a dynamic acoustic environment, such as a sporting event or a party, where the ambient acoustic signals may vary in proximity and intensity over short periods.

Additionally, microphone array directionality, selectivity (e.g., number of active microphones), and/or microphone array filter selection can be adjusted based upon detected characteristics of the acoustic environment proximate the personal audio device 10, e.g., where the characteristics of the acoustic environment are detected by the sensor system 36. For example, microphone(s) can detect the acoustic signature of the user's voice, and the audio demonstration engine 210 can be configured to adjust the microphone array directionality to direct the array toward the front of the user's head (e.g., proximate the user's mouth) to detect voice commands. In other cases, the microphone(s) can detect an acoustic signature of ambient acoustic signals in order to cancel or otherwise minimize those signals (e.g., low-level noise such as the hum or an appliance, or wind noise). The audio demonstration engine 210 can apply filters to these ambient acoustic signals based upon the operating mode of the personal audio device 10. For example, wind noise reduction can be suitable for demonstration while the user 225 is on a phone call using the personal audio device 10.

Additionally, where the sensor system 36 detects that the user 225 is accelerating or decelerating, the audio demonstration engine 210 can be configured to demonstrate ANR functions of the personal audio device 10. For example ANR functions can be demonstrated to show effects on high v. low pressure events (e.g., a door slamming, vehicle accelerating, plane ascending). Additionally, detecting acceleration and/or deceleration can be used to trigger demonstration of different listening modes. e.g., when the user 225 is accelerating, the audio demonstration engine 210 can offer to demonstrate general listening mode so that the user 225 can clearly hear ambient acoustic signals, or to reduce the acoustic occlusion that some users experience when taking steps. In another case, the audio demonstration engine 210 can offer to demonstrate conversation mode in response to detecting that the user 225 quickly moves or jerks his/her head in a direction. This can enable the user 225 to focus on the acoustic sound source in his/her look direction. In other cases, where the sensor system 36 detects that the user 225 is proximate another user (e.g., via network interface communication such as Wi-Fi. BLE), the audio demonstration engine 210 can offer to share one or more demonstration functions between the user 225 and this other user. For example, the audio demonstration engine 210 can prompt the user 225 to initiate a peer-to-peer (P2P) music or other file sharing demonstration, two-way communication demonstration and/or shared listening/interaction demonstration with the other user when that other user is detected as being proximate the user 225.

In particular cases, the audio demonstration engine 210 can initiate a voice pick-up demonstration mode in response to detecting that the personal audio device 10 is in a noisy environment. For example, microphones in the sensor system 36 can detect an ambient noise level (SPL) that is above a threshold, and in response to receiving data indicating the ambient noise level is above the threshold, the audio demonstration engine 210 prompts the user 225 to initiate a voice pick-up demonstration mode. In the case of a headphone system, the personal audio device 10 can run a binaural voice pick-up algorithm, for example, using one or more beamformed microphones for each earpiece that can effectively detect the user's voice. This voice detection approach and variations of that approach are described in U.S. patent application Ser. No. 15/463,368, filed Mar. 20, 2017, titled "Audio Signal Processing for Noise Reduction", which is incorporated herein by reference in its entirety. In the voice pick-up demonstration mode, the audio demonstration engine 210 is configured to switch between microphones used in one or more earpieces (e.g., use a single microphone, a pair of beamformed microphones on one earcup, use the full binaural algorithm with two beamformed microphones on each cup, or variations in between), and/or change the processing applied to the microphones (e.g., beamforming or no beamforming, and/or other conventional signal processing techniques). In some additional cases, the audio demonstration engine 210 can be configured to simulate conditions for a voice pick-up demonstration, for example, by initiating playback of acoustic noise at the separate playback device (e.g., smart device 280, such as any connected device including a speaker). This simulated noise can be used to enhance the demonstrability of the voice pick-up functions of the personal audio device 10. The audio demonstration engine 210 can also be configured to initiate audio playback of noise at different simulated noise levels during the voice pick-up demonstration mode, which can improve the user's ability to hear distinctions between microphone pickup selection options and/or signal processing options.

After processing the first acoustic signal according to the acoustic demonstration settings to generate the second acoustic signal, the audio demonstration engine 210 is further configured to output the (second) acoustic signal(s) for playback at the personal audio device 10. e.g., at transducers 28 (process 450, FIG. 3). In certain cases, the second acoustic signal(s) are provided as binaural playback (e.g., in a headphone or earphone configuration), however, these acoustic signals can be output at the personal audio device 10 according to any conventional approaches. In some cases, these (second) acoustic signals include signals that have been filtered according to one or more approaches described herein.

As noted herein, in various implementations, the audio played back at the separate audio playback device (e.g., smart device 280) includes demonstration audio configured to demonstrate particular acoustic features of the personal audio device 10. Examples of the various demonstration modes can include active noise reduction (ANR), controllable noise cancellation (CNC), voice pick-up, biometric control, augmented reality (AR), etc.

Figure 4:
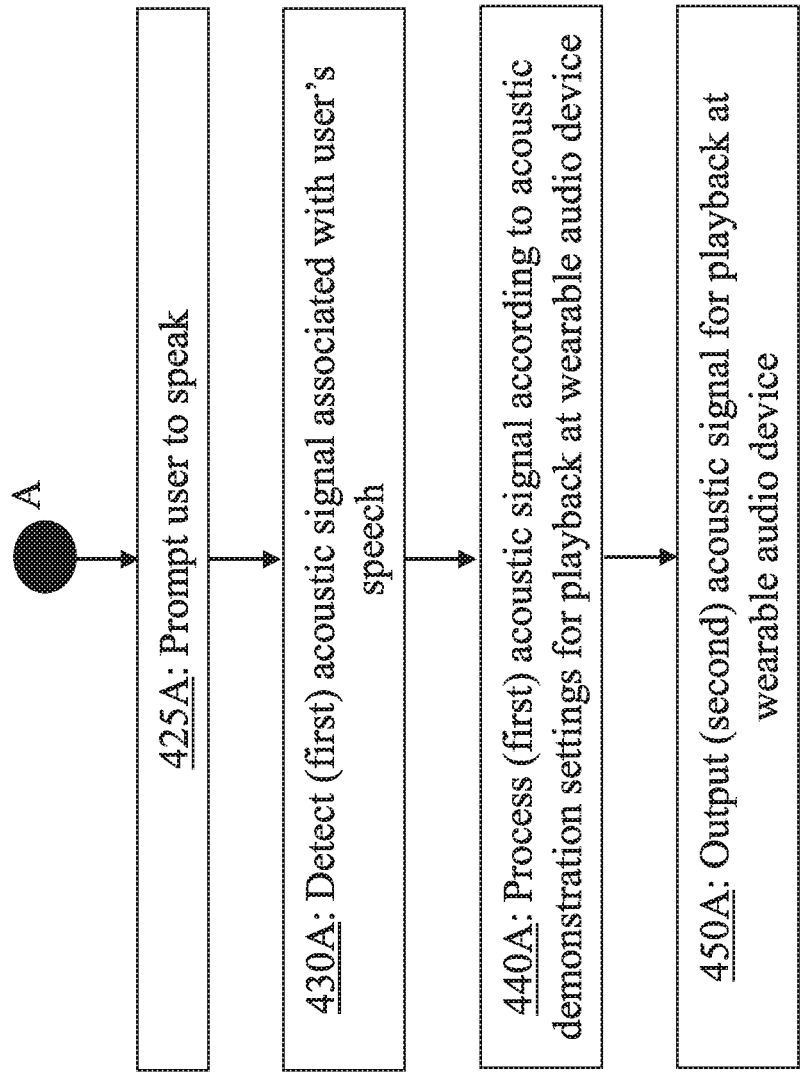
FIG. 4 is an additional process flow diagram illustrating processes performed in concert with processes depicted in FIG. 3.

FIG. 4 is a flow diagram illustrating processes in a demonstration mode performed in conjunction with processes 425 through 450 in FIG. 3. In these implementations, additional acoustic signal processing is performed (e.g., signal processing algorithms are applied) according to demonstration mode settings. These processes are performed by the audio demonstration engine 210 in parallel, series or in place of one or more processes illustrated and described with reference to FIG. 3. For ease of illustration, these processes are shown as parallel processes at node A.

In certain implementations, as shown in FIG. 4, in the case that demonstration audio playback is initiated at the audio playback device (e.g., smart device 280) in process 425 (FIG. 3), the audio demonstration engine 210 prompts the user 225 to speak (process 425A, FIG. 4). The prompt can take any form described herein, and can request that the user speak in a conversational tone, or recite a particular phrase (e.g., "Please speak conversationally for 10 seconds", or "Begin speaking now", or "Repeat phrase X"). In any case, while the demonstration audio is being played from the audio playback device, the user 225 is speaking.

As is also illustrated in FIGS. 3 and 4, in some implementations, processes 425A-450A can be performed without initiating audio playback of demonstration audio at the audio playback device. That is, according to various implementations, the audio demonstration engine 210 prompts the user 225 to speak (process 425A, FIG. 4) without playing back demonstration audio. In certain implementations, after prompting the user 225 to speak, the audio demonstration engine 210 adjusts a signal processing algorithm used for detecting the acoustic signal associated with the user's speech, according to the demonstration mode settings.

Regardless of whether demonstration audio is played during the user's speech, the audio demonstration engine 210 is configured to detect the acoustic signal associated with the user's speech (process 430A, FIG. 4), as picked up by one or more microphones at the personal audio device 10. In various implementations, the acoustic signal is compared with audio files 265 to characterize that acoustic signal, for example, as a voice signal. In various other implementations, the acoustic signal is analyzed or measured to detect particular characteristics of the acoustic signal (e.g., SPL, frequency content, frequency response at particular frequency ranges, that the signal originated from the user, etc.). In particular cases, the audio demonstration engine 210 is configured to identify the voice signal as the voice of user 225, e.g., by matching the acoustic signature of the detected signal(s) with audio files 265 including acoustic signatures of the user's voice, or by using a voice activity detector or other circuitry configured to detect the user's voice.

The audio demonstration engine 210 is further configured to process the (first) acoustic signal (including signals associated with the user's speech) according to acoustic settings to the personal audio device 10 (process 440A, FIG. 4). In some particular cases, this process includes adjusting a number of microphones or configuration (e.g., direction) of microphones used to detect the acoustic signal associated with the user's speech. For example, a single microphone can be used to demonstrate primary microphone functions of the personal audio device 10, whereas two or more microphones can be used to demonstrate beamforming functions of the personal audio device 10. The number of microphones and/or configuration of microphones used for detecting the user's speech can also be modified to demonstrate different voice effects in the acoustic signal.

In other particular cases, the audio demonstration engine 210 applies one or more filters to the acoustic signal associated with the user's speech. Regardless of whether the demonstration audio is played back during the user's speech, these filters can include specific frequency bands for voice signals, so as to enhance or diminish the effects of the user's speech on the playback at the personal audio device 10.

After processing the first acoustic signal(s) and generating a second acoustic signal, the audio demonstration engine 210 is configured to output the second acoustic signal (e.g., associated with the user's speech) for playback to the user 225 at the personal audio device 10 (process 450A, FIG. 4). This process can be performed similarly to process 450 (FIG. 3). e.g., at transducers 28 on the personal audio device 10. In various implementations, the second acoustic signal (s) associated with the user's speech includes a voice signal. In particular cases, the voice signal is output along with the acoustic signals associated with the demonstration audio, for example, to demonstrate features of the personal audio device 10. For example, the voice signals can be filtered according to a voice pick-up algorithm, as described in U.S. patent application Ser. Nos. 15/627,905 and 15/463,368.

Returning to FIG. 3, in some additional implementations, the audio demonstration engine 210 can be further configured to apply different acoustic demonstration settings (e.g., different filters and/or different signal processing algorithms) to detected (first) acoustic signals (process 440, FIG. 3) based upon different demonstration modes. In certain cases, the audio demonstration engine 210 is configured to initiate a CNC demonstration mode to demonstrate CNC capabilities of the personal audio device 10 to the user 225. In one example, the audio demonstration engine 210 is configured to apply a set of distinct CNC filters to the received acoustic signals at the personal audio device 10. In some optional implementations, the audio demonstration engine 210 is also configured to initiate playback of demonstration audio at the audio playback device, such as low-frequency noise, music, or high-frequency noise during the CNC demonstration mode, however, demonstration audio playback is not necessary to demonstrate CNC functions.

According to various implementations, the audio demonstration engine 210 uses feedback from microphones on the personal audio device 10 to adjust the playback (e.g., volume) of demonstration audio from another device (e.g., smart device 280). In some cases, this aids in providing a consistent demonstration experience to the user 225, e.g., where variations in the speaker volume and/or speaker loudness settings at the personal audio device 10 as well as speaker orientation at the personal audio device 10 affect the demonstration. The audio demonstration engine 210 can use the feedback from the microphones on the personal audio device 10 to adjust the playback volume of the demonstration audio at the other device (e.g., smart device 280).

In cases where the personal audio device 10 detects acoustic signals (e.g., one or more first acoustic signals) after the demonstration audio has been initiated, the audio demonstration engine 210 applies a set of distinct CNC filters, in a sequence, to those detected acoustic signals to demonstrate CNC capabilities of the personal audio device 10. That is, the audio demonstration engine 210 is configured to process the received first acoustic signal(s) by applying one or more CNC filters to the signal(s), and output a processed (or, second) acoustic signal for playback at the personal audio device 10. For example, the audio demonstration engine 210 can provide progressive or regressive sequences of noise cancelling that mimic the adjustments that the user 225 can make to noise cancelling functions on the personal audio device 10. In some particular cases, the audio demonstration engine 210 applies a first set of CNC filters for a period, then adjusts to a second set of CNC filters for a period, then adjust to a third set of CNC filters for another period (where periods are identical or distinct from one another). The user 225 can then experience how distinct CNC filters compare with one another, for example, by permitting more or less ambient sound (or, "world noise") to enter the playback at the transducers 28. In various implementations the CNC demonstration mode can be performed without demonstration audio being played from another device (e.g., smart device 280). That is, the CNC demonstration mode can be used to demonstrate controlled noise cancelling functions relative to ambient acoustic signals in an otherwise unaltered acoustic environment.

In other examples, the demonstration mode can include an augmented reality (AR) demonstration mode, where the audio demonstration engine 210 overlays AR playback with the playback from the detected acoustic signal. In some cases, this can include overlaying audio playback related to an AR feature with the detected acoustic signal at the transducers 28.

In particular examples, the audio demonstration engine 210 is configured to detect a location of the personal audio device 10 (e.g., using location tracking information from the sensor system 36), and identify AR information associated with that location (e.g., AR playback). The audio demonstration engine 210 is then configured to initiate an AR demonstration mode at the personal audio device 10. The AR demonstration mode can include processing the AR information according to audio AR demonstration settings, e.g., by providing AR playback in conjunction with processed acoustic signals detected from the environment proximate the personal audio device 10. The audio demonstration engine 210 is further configured to output an acoustic signal to the user 225 at the personal audio device based upon that processed AR information.

In some example cases, the audio demonstration engine 210 is configured to apply a filter to the detected acoustic signal, and to overlay the AR playback with playback from the filtered detected acoustic signal. However, in other cases, the audio demonstration engine 210 does not apply a filter to the detected acoustic signal during the AR demonstration mode. e.g., where noise canceling or noise reduction are not employed. In these cases, the audio demonstration engine 210 overlays the AR playback with playback from the detected (unfiltered) acoustic signal and provides that playback to the user 225.

Where the AR system includes a navigation function, the AR audio playback can include walking directions to a user 225 wearing an AR headset or other AR device as the user 225 navigates an area. Other examples of AR playback can include audio pins or audio caches associated with particular locations that are triggered as the user 225 approaches those locations. Additional AR playback can include informational content (e.g., menu listings for restaurants, performance listings for concert venues, or sporting schedules for stadiums) provided to the user 225 based upon the user's location, orientation, etc. relative to the subjects of the information. In any case, the audio demonstration engine 210 can be configured to overlay this AR audio content with the filtered detected acoustic signal(s), e.g., to provide this AR audio content within the context of the demonstrated audio mode.

In additional implementations, the audio demonstration engine 210 can be configured to provide A/B comparisons of processing performed with and without demonstrated functions. Such A/B comparisons can be used in voice pick-up demonstration mode, CNC mode. ANR mode. etc. In various implementations, the audio demonstration engine 210 is configured to (e.g., sequentially) play back recorded feeds of processed audio and unprocessed audio for the user 225 to demonstrate acoustic features of the personal audio device 10. For example, the audio demonstration engine 210 can run two distinct processing approaches simultaneously. That is, the two distinct processing approaches can include a first processing approach and a second processing approach. In these cases, the first processing approach records unprocessed acoustic signals received at the microphones on the personal audio device 10. e.g., the user's voice, ambient noise signals, etc. The second processing approach records processed acoustic signals as modified by one or more audio setting adjustments described herein (e.g., beamforming algorithm(s), microphone filtering, and/or microphone array directionality/selectivity).

In some cases, outputting the second acoustic signal for playback at the personal audio device 10 includes sequentially outputting acoustic signals processed using the first processing approach and acoustic signals processed using the second processing approach. In particular cases, the audio demonstration engine 210 can separately transmit the two audio files to the separate audio playback device (e.g., smart device 280) for storage and playback at the personal audio device 10. The audio files can be transmitted back to the personal audio device 10, e.g., using custom protocol commands due to single channel audio transmission limitations of certain protocols (e.g., hands-free protocol (HFP)). These audio files can be played back at the personal audio device 10 to demonstrate the differences between the unprocessed versus the processed acoustic signals according to one or more demonstration mode settings.

In some cases, these audio files are played back sequentially to aid in demonstrating the functions of the personal audio device 10. In the particular example of a voice pickup demonstration, applying the acoustic demonstration settings includes applying two distinct processing approaches to acoustic signals detected at the personal audio device 10: i) recording unprocessed acoustic signals including ambient acoustic signals and the voice signals from the user 225 as detected at the personal audio device 10; and ii) recording processed acoustic signals including the ambient acoustic signals and the voice signals from the user 225 as detected at the personal audio device 10. This process can further include playing back the recorded unprocessed acoustic signals and the recorded processed signals sequentially to demonstrate the voice pickup functions of the personal audio device 10, that is, to provide the user 225 with an audible, near-contemporaneous representation of the benefits of the personal audio device 10 functions. In example implementations, in the context of the voice pickup demonstration, the "processed" acoustic signals are those signals to which one or more filters are applied and/or to which microphone selectivity is applied, as described herein.

While the audio demonstration engine 210 is described herein as being configured to facilitate demonstration of various functions on the personal audio device 10, it can further be configured to control audio connections between the personal audio device 10 and the separate audio playback device (e.g., smart device 280). For the purposes of this portion of the description, the separate audio playback device is referred to interchangeably with the smart device 280. As described herein, the smart device 280 can include a network interface, similar to the network interface 34 described with respect to the personal audio device 10. In various implementations, the smart device 280 and the personal audio device 10 are configured to establish a dedicated audio connection such that audio playback retrieved at the smart device 280 is played back at the personal audio device 10. Examples of this capability include conventional Bluetooth (BT)-based audio communications, where audio files controlled on the smart device 280 are played back on the personal audio device 10 using the established audio connection. In these cases, when the audio connection is established, it may not be possible to play audio at the smart device 280 without simultaneously playing that audio on the personal audio device 10. Various aspects described herein can control this audio connection for providing effective demonstration of personal audio device capabilities.

Figure 5:
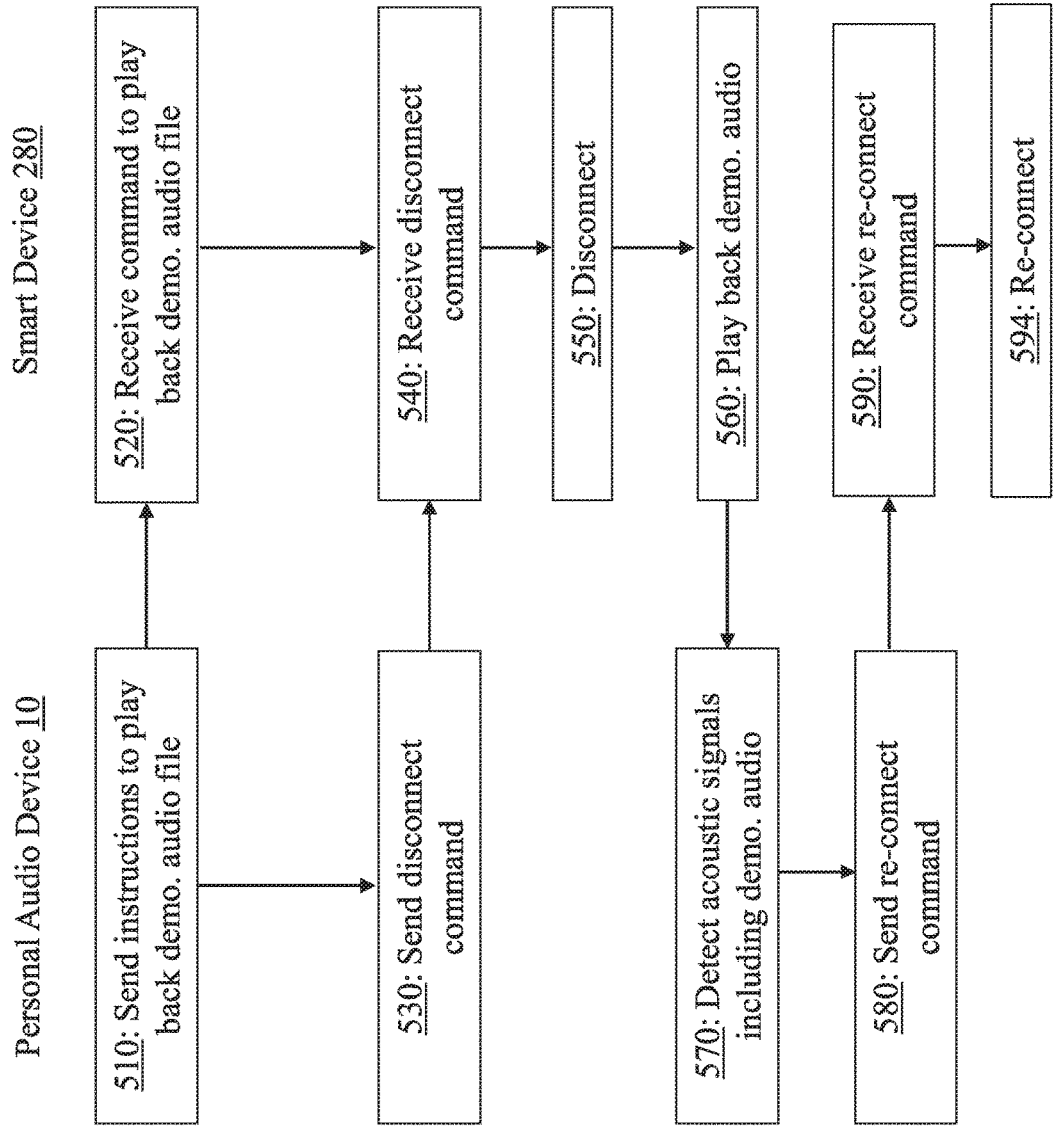
FIG. 5 is a swim lane diagram illustrating processes performed by a personal audio device and a smart device according to various implementations.
Figure 6:
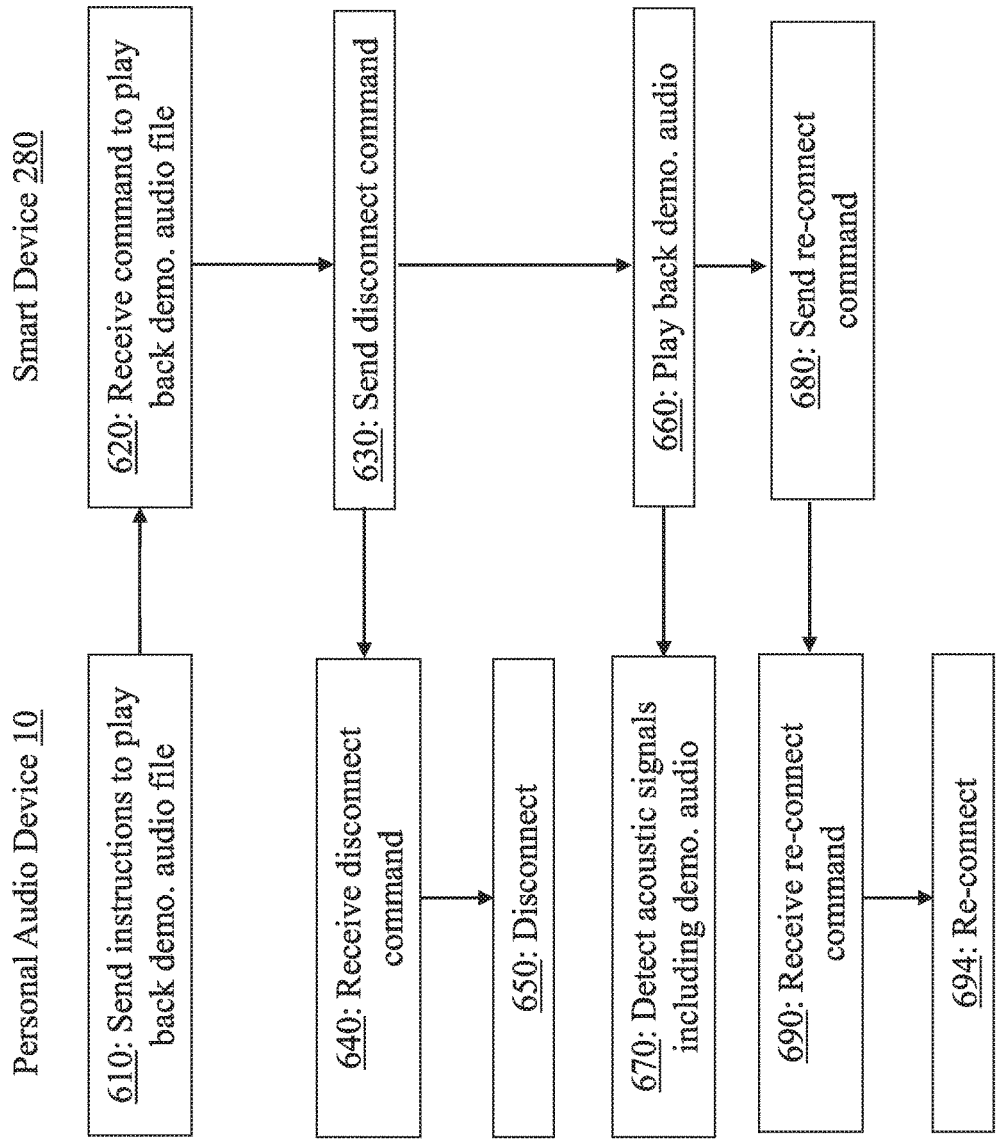
FIG. 6 is a swim lane diagram illustrating processes performed by a personal audio device and a smart device according to various additional implementations.

FIG. 5 shows a swim lane diagram illustrating processes performed by the personal audio device 10 and the smart device 280 to manage an audio connection between these devices according to one or more demonstration modes. The swim lane diagram in FIG. 5 shows control functions primarily performed by the personal audio device 10 (e.g., by the control circuit 30 on the personal audio device 10). FIG. 6 shows a similar swim lane diagram as FIG. 5, but illustrates control functions primarily performed by the smart device 280 (e.g., by a control circuit on the smart device). It is understood that the demonstration functions described according to various implementations can be controlled by the personal audio device 10 and/or the smart device 280. It is further understood that these demonstration functions illustrated with respect to FIG. 5 and FIG. 6 are intended to illustrate scenarios where application programming is not able to control transmission of audio across a device connection (e.g., BT connection) versus outputting that audio at speakers on the smart device 280. That is, these scenarios may be less beneficial in circumstances where an application programmer can specify which content is transmitted through the device connection and which content is transmitted by audio output at speakers in the smart device 280.

As shown in FIG. 5, in process 510, the control circuit 30 sends instructions to the smart device 280 to play back a demonstration audio file. In some cases, where the audio communications protocol is a BT protocol, the instructions can include custom protocol commands sent in response to receiving a user command to initiate a demonstration mode for the personal audio device 10. In some cases, the instructions to play back the demonstration audio file include instructions to play back that file on a delay. However, in various implementations, these delay instructions are not necessary, as the smart device 280 will trigger playback based upon confirmation of a BT audio disconnect. In process 520, the smart device 280 receives the command to playback the demonstration audio file. In process 530, the personal audio device 10 can send a disconnect command to the smart device 280, to disconnect the established audio connection (e.g., BT audio connection) between the personal audio device 10 and the smart device 280. In certain implementations, the smart device 280 receives the disconnect command at process 540, and disconnects the audio connection at process 550.

In process 560, the smart device 280 initiates playback of the demonstration audio file (in some cases, after the delay). This demonstration audio file can take the form of any demonstration audio file described herein, e.g., music, background conversation, low-frequency noise, high frequency noise, or audio associated with any other type of noise environment (e.g., crowd noise, café noise, bus noise, train noise, airplane noise, etc.). In process 570, the personal audio device 10 detects acoustic signals, including the acoustic signals from the playback of the demonstration audio file at the smart device 280. As described with respect to various implementations herein, the detected acoustic signals can be filtered or otherwise output as audio playback to the user 225 at the personal audio device 10 according to demonstration mode settings.

In process 580, the personal audio device 10 sends an audio connection reconnect command to the smart device 280. This audio connection reconnect command can be sent in response to detecting the acoustic signals including the demonstration audio (process 570), or can be sent after a time delay synchronized with the playback delay. The smart device 280 receives the audio connection reconnect command in process 590, and the audio connection (e.g., BT audio connection) between the personal audio device 10 and the smart device is re-established in process 594.

In some cases, audio connection/disconnection commands can be controlled by application programming interface(s), e.g., in the audio demonstration engine 210, or via custom protocol commands between the personal audio device 10 and the smart device 280. In various implementations, these audio connection/disconnection commands will not terminate a control channel connection between the personal audio device 10 and the smart device 280 and/or will permit reconnection over Bluetooth if the devices are fully disconnected, meaning that the personal audio device 10 and the smart device 280 can discover one another and initiate audio reconnection when beneficial (e.g., when playback of a demonstration audio files file completes). In additional implementations, disconnection and/or reconnection can be controlled by a clock timer or triggering event, e.g., when playback of a demonstration audio file completes.

As described according to the swim lane diagram in FIG. 5, disconnecting the established audio connection between the personal audio device 10 and the smart device 280, and initiating playback of the demonstration audio file, is controlled to permit playback of the demonstration audio file at the smart device 280 independently of the personal audio device 10. That is, this approach permits independent playback of demonstration mode content from the smart device 280 in order to demonstrate a broad array of personal audio device capabilities.

In example implementations, with reference to FIG. 5, the user 225 can initiate a demonstration mode in the personal audio device 10, e.g., using any interface command described herein. The personal audio device 10 sends instructions to the smart device 280 to play back a demonstration audio file, e.g., a simulated noise file for demonstrating focused listening capabilities of the personal audio device 10. The smart device 280 then sends the audio disconnect command to the personal audio device 10, which disconnects the audio connection with the smart device. The smart device 280 then plays the simulated noise. The personal audio device 10 detects acoustic signals using microphones, including the simulated noise signals. The personal audio device 10 can process those detected signals according to various implementations described herein, e.g., in the focused listening scenario, the personal audio device 10 applies at least one filter to the detected noise signals to demonstrate microphone directionality relative to the noise source. After playing back the demonstration audio file, the smart device 280 sends a re-connect command to the personal audio device 10, which re-establishes the audio connection with the smart device 280.

FIG. 6 shows a swim lane diagram from the perspective of the smart device 280, which manages the audio disconnect/re-connect with the personal audio device 10. Various processes in this swim lane diagram are similar to those described with respect to the swim lane diagram in FIG. 5. For example, processes 610 and 620 (including sending instructions for playback and receiving playback instructions) can be substantially similar to processes 510 and 520 described with respect to the swim lane diagram in FIG. 5. However, in process 630, the smart device 280 sends the disconnect command to the personal audio device 10, which receives the disconnect command in process 640, and disconnects the communications connection in process 650.

Similarly to the swim lane diagram in FIG. 5, the smart device 280 can play back the demonstration audio file at process 660, and the personal audio device 10 can detect acoustic signals including those from the demonstration audio playback at process 670.

In various implementations, the user 225 can provide the command to the smart device 280 to initiate the demonstration mode, which can include managing audio connections between the personal audio device 10 and the smart device 280 as described herein. In these case, the command to play back the demonstration audio file (process 620), disconnect command (process 630), and playback of the demonstration audio (process 660) can be controlled sequentially at the smart device 280 without requiring a clock timer or other delay mechanism. In these cases, the smart device 280 sequentially disconnects with the personal audio device 10, plays back the demonstration audio, and then re-connects with the personal audio device 10 after that playback has concluded. As shown in process 680, the smart device 280 sends a re-connect command to the personal audio device 10. This reconnect command can be sent in response to detecting that the playback of the demonstration audio file is complete. In other cases, the re-connect command can be sent on a time delay. e.g., as controlled by a clock timer. In any case, the personal audio device 10 receives the re-connect command in process 690, and re-establishes the audio connection (e.g., BT audio connection) in process 694.

In example implementations, with reference to FIG. 6, the user 225 can initiate a demonstration mode in the personal audio device 10, e.g., using any interface command described herein. The personal audio device 10 sends instructions to the smart device 280 to play back a demonstration audio file. e.g., a simulated noise file for demonstrating ANR capabilities of the personal audio device 10. The personal audio device 10 then sends the audio disconnect command to the smart device 280, which disconnects the audio connection with the personal audio device 10, and plays the simulated noise. The personal audio device 10 detects acoustic signals using microphones, including the simulated noise signals. The personal audio device 10 can process those detected signals according to various implementations described herein, e.g., in the ANR scenario, the personal audio device 10 applies at least one filter to the detected noise signals to demonstrate ANR functions of the device 10. After detecting these acoustic signals (e.g., including the noise signals), the personal audio device 10 reconnects with the smart device 280.

As noted herein, approaches described with respect to FIGS. 5 and 6 can be beneficial in scenarios where application programming is not able to control transmission of audio across a device connection (e.g., BT connection) versus outputting that audio at speakers on the smart device 280. Classic BT control messages are orthogonal to the audio streamed over BT. In these cases, profiles such as SPP, iAP or RFCOMM can be used to exchange custom protocol commands between the personal audio device 10 and the smart device 280. Independently of these commands. A2DP or HFP profile connections can be connected and/or disconnected, e.g., as described herein. In yet other cases, BLE is used as a distinct command interface from the classic BT connection, and sends custom control messages between the personal audio device 10 and the smart device 280. In this sense, not all connection configurations will benefit from the approaches described with respect to FIGS. 5 and 6.

According to various implementations, the user 225 can experience various demonstrations audio device capabilities. In some particular implementations, the user 225 can also collect rewards, status or other credentials for completing demonstrations. That is, the audio demonstration engine 210 can be configured to track completed demonstrations for the user 225 and/or other users, and enable a game-style or social media-style credential comparison based upon accomplished demonstrations. For example, the user 225 can receive rewards for completing particular demonstrations using the personal audio device 10 (e.g., early product release/purchase options, credit toward digital media content, early access to tickets for music venues or performers). Additionally, the user 225 can compare his/her "status" in completing a set of demonstration modes versus other users, for example, linked through the profile system 300. The audio demonstration engine 210 can track this status and/or rewards information for the user 225, and may prompt the user 225 to engage in additional demonstration modes to increase his/her status and/or add rewards or other credentials.

Returning to FIG. 2, after presenting the user 225 with the demonstration audio experiences, the audio demonstration engine 210 can be configured to receive feedback from the user 225 about the about each demonstration and/or feature of the personal audio device 10. The audio demonstration engine 210 can include feedback logic 310 for analyzing the feedback from the user 225 about the audio demonstration files. In various implementations, user 225 can provide either a verbal response or a response to a user interface prompt. In particular cases, the feedback can include adjustment of an interface control such as a knob, button, toggle, incremental interface adjustment.

While some examples of feedback are described with respect to a user interface, it is understood that feedback and/or other audio inputs such as sensor data can include an audio signal, and may be analyzed using acoustic feature extraction for one or more features including: energy, zero-crossing rate, mel-frequency cepstral coefficients, spectral flatness, summary statistics (e.g., mean, variance, skew or kurtosis) on any signal measurement, tempo/beats-per-minute and acoustic fingerprinting. In some cases, audio demonstration engine 210 (and logic therein) can use these acoustic features from feedback or other audio inputs, and metadata features from user adjustments during the demonstration modes, to perform statistical and probabilistic modeling in order to recommend or select audio settings 270 for the user 225 in accordance with other functions.

With continuing reference to FIG. 2, and as noted herein, the audio demonstration engine 210 can include feedback logic 310 for processing feedback received from the user 225, e.g., via one or more interfaces. The feedback logic 310 can be connected with settings lookup/adjustment logic 320, as well as sensor data processing logic 330, and can provide feedback, e.g., to the settings lookup/adjustment logic 320 for use in adjusting the settings 270 on the personal audio device 10. The sensor data processing logic 330 can also provide sensor data to the settings lookup/adjustment logic 320 for use in adjusting the settings 270 on the personal audio device 10. In some cases, feedback logic 310 can be configured to teach sensor data processing logic 330 and settings lookup/adjustment logic 320 about preferences of user 225. e.g., where one or more of these logic components includes an artificial intelligence (AI) component for iteratively refining logic operations to enhance the accuracy of its results. Example AI components could include machine learning logic, a neural network including an artificial neural network, a natural language processing engine, a deep learning engine, etc. In any case, feedback logic 310 can be configured to analyze feedback and enhance future operations of audio demonstration engine 210. It is further understood that feedback logic 310, settings lookup/adjustment logic 320 and/or sensor data processing logic 330 may be interconnected in such a manner that these components act in concert or in reliance upon one another.

The audio demonstration engine 210 is described in some examples as including logic for performing one or more functions. In various implementations, the logic in audio demonstration engine 210 can be continually updated based upon data received from the user 225 (e.g., user selections or commands), sensor data received from the sensor system 36, settings updates (in settings library 260), updates and/or additions to the audio library 240 and/or updates to user profile(s) 290 in the profile system 300.

In some example implementations, audio demonstration engine 210 (e.g., using feedback logic 310, settings lookup/adjustment logic 320 and/or sensor data processing logic 330) is configured to perform one or more of the following logic processes using sensor data, command data and/or other data accessible via profile system 300, smart device 280, etc.; speech recognition, speaker identification, speaker verification, word spotting (e.g., wake word detection), speech end pointing (e.g., end of speech detection), speech segmentation (e.g., sentence boundary detection or other types of phrase segmentation), speaker diarization, affective emotion classification on voice, acoustic event detection, two-dimensional (2D) or three-dimensional (3D) beam forming, source proximity/location, volume level readings, acoustic saliency maps, ambient noise level data collection, signal quality self-check, gender identification (ID), age ID, echo cancellation/barge-in/ducking, language identification, and/or other environmental classification such as environment type (e.g., small room, large room, crowded street, etc.; and quiet or loud).

In some implementations, audio demonstration engine 210 is configured to work in concert with sensor system 36 to continually monitor changes in one or more environmental conditions. In some cases, sensor system 36 may be set in an active mode, such as where a position tracking system pings nearby Wi-Fi networks to triangulate location of the personal audio device 10, or a microphone (e.g., microphones 18 and/or 24) remains in a "listen" mode for particular ambient sounds. In other implementations, sensor system 36 and audio demonstration engine 210 can be configured in a passive mode, such as where a wireless transceiver detects signals transmitted from nearby transceiver devices or network devices. In still other implementations, distinct sensors in the sensor system 36 can be set in distinct modes for detecting changes in environmental conditions and transmitting updated sensor data to audio demonstration engine 210. For example, some sensors in sensor system 36 can remain in an active mode while audio device 10 is active (e.g., powered on), while other sensors may remain in a passive mode for triggering by an event.

As described herein, user prompts can include an audio prompt provided at the audio device 10, and/or a visual prompt or tactile/haptic prompt provided at the audio device 10 or a distinct device (e.g., smart device 280). In some cases, an audio prompt can include a phrase such as, "Would you like to experience a demonstration of audio mode X?," or "Respond with a nod or "yes" to experience demo Y," or, "Take action Z to initiate a demonstration mode for your particular location." These are merely examples of audio prompts, and any suitable audio prompt could be used to elicit actuation by the user 225. In other cases, a visual prompt can be provided, e.g., on a smart device 280 or at the audio device 10 (e.g., at a user interface) which indicates that one or more demonstration modes or modifications are available. The visual prompt could include an actuatable button, a text message, a symbol, highlighting/lowlighting, or any other visual indicator capable of display on the audio device 10 and/or the smart device 280. A tactile/haptic prompt can include, e.g., a vibration or change in texture or surface roughness, and can be presented at the audio device 10 and/or smart device 280. This tactile/haptic prompt could be specific to the audio demonstration engine 210, such that the tactile/haptic prompt is a signature which indicates the demonstration mode (e.g., AR mode, voice pickup mode) is available. As the tactile/haptic prompt may provide less information about the underlying content offered, distinct tactile/haptic prompts could be used to reflect priority, e.g., based upon user profile(s) 290 or other settings.

In some particular implementations, actuation of the prompt can be detectable by the audio device 10, and can include a gesture, tactile actuation and/or voice actuation by user 225. For example, user 225 can initiate a head nod or shake to indicate a "yes" or "no" response to a prompt, which is detected using a head tracker in the sensor system 36. In additional implementations, the user 225 can tap a specific surface (e.g., a capacitive touch interface) on the audio device 10 to actuate the prompt, or can tap or otherwise contact any surface of the audio device 10 to initiate a tactile actuation (e.g., via detectable vibration or movement at sensor system 36). In still other implementations, user 225 can speak into a microphone at audio device 10 to actuate the prompt and initiate the personalization functions described herein.

In some other implementations, actuation of the prompt is detectable by the smart device 280, such as by a touch screen, vibrations sensor, microphone or other sensor on the smart device 280. In certain cases, the prompt can be actuated on the audio device 10 and/or the smart device 280, regardless of the source of the prompt. In other implementations, the prompt is only actuatable on the device from which it is presented. Actuation on the smart device 280 can be performed in a similar manner as described with respect to audio device 10, or can be performed in a manner specific to the smart device 280.

The demonstration mode processes described according to various implementations can significantly improve the user experience when compared with conventional approaches, for example, by providing the user with a contextual understanding of the capabilities of the personal audio device 10. The demonstration mode processes described according to various implementations can ease user setup of the personal audio device 10 and improve device engagement during use. Additionally, certain implementations allow the user to personalize audio settings that may otherwise go unnoticed or under-utilized. Because the personal audio device 10 is often used in dynamic settings (travel, commuting, etc.), users can appreciate the various functions of the personal audio device 10 across these settings.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A computer-implemented method, comprising:
    initiating a demonstration mode in a wearable audio device, wherein the demonstration mode comprises a voice pickup demonstration mode;
    detecting a first acoustic signal at the wearable audio device, wherein the first acoustic signal detected at the wearable audio device comprises voice signals from a user of the wearable audio device;
    processing the first acoustic signal according to acoustic demonstration settings at the wearable audio device based upon the demonstration mode, wherein the processing generates a second acoustic signal, wherein processing the detected voice signals according to the acoustic demonstration settings comprises applying at least one filter to the voice signals to generate processed voice signals; and
    outputting the second acoustic signal for playback at the wearable audio device including outputting the processed voice signals,
    wherein processing the detected voice signals according to the acoustic demonstration settings in the voice pickup demonstration mode comprises applying two distinct processing approaches to the detected voice signals, wherein the two distinct processing approaches comprise a first processing approach and a second processing approach, and outputting the second acoustic signal for playback at the wearable audio device comprises sequentially outputting acoustic signals processed using the first processing approach and acoustic signals processed using the second processing approach.

2. The computer-implemented method of claim 1, wherein the demonstration mode is initiated in response to receiving a user command via an interface to demonstrate an acoustic feature of the wearable audio device,
    wherein the first acoustic signal further comprises ambient acoustic signals as detected at the wearable audio device with the voice signals from the user, wherein the acoustic signals remain unprocessed according to the first processing approach, and
    wherein sequentially outputting the acoustic signals processed using the first processing approach and the second processing approach audibly demonstrates voice pickup functions in the wearable audio device.

3. The computer-implemented method of claim 1, wherein one or more microphones is used to detect the first acoustic signal at the wearable audio device, and wherein processing the first acoustic signal according to the acoustic demonstration settings comprises modifying the number of microphones used to detect the first acoustic signal.

4. The computer-implemented method of claim 1, wherein processing the first acoustic signal according to the acoustic demonstration settings comprises selecting a signal processing algorithm to apply to the first acoustic signal.

5. The computer-implemented method of claim 1, further comprising:
    prompting the user to speak during the detecting of the first acoustic signal;
    adjusting a number of microphones for detecting an acoustic signal associated with the user's speech according to the settings in the demonstration mode;
    detecting the acoustic signal associated with the user's speech using the adjusted number of microphones;
    processing the acoustic signal associated with the user's speech to generate a voice signal; and
    outputting the voice signal for playback to the user.

6. The computer-implemented method of claim 1, further comprising:
    prompting the user to speak during the detecting of the first acoustic signal;
    adjusting a signal processing algorithm used for detecting an acoustic signal associated with the user's speech, according to the settings in the demonstration mode;
    detecting the acoustic signal associated with the user's speech;
    processing the acoustic signal associated with the user's speech to generate a voice signal; and
    outputting the voice signal for playback to the user.

7. The computer-implemented method of claim 1, further comprising:
    detecting a biometric signal about a user at the wearable audio device, wherein the acoustic demonstration settings are selected based upon the detected biometric signal.

8. A wearable audio device comprising:
    an acoustic transducer for providing audio playback to a user;
    a communications module for establishing a connection with a separate audio playback device; and
    a control circuit coupled with the acoustic transducer and the communications module, the control circuit configured to:
        initiate a demonstration mode in the wearable audio device;

detect a first acoustic signal at the wearable audio device;
detect a biometric signal about a user at the wearable audio device;
process the first acoustic signal according to acoustic demonstration settings at the wearable audio device based upon the demonstration mode, wherein the acoustic demonstration settings are selected based upon the detected biometric signal, wherein the processing generates a second acoustic signal; and
output the second acoustic signal for playback at the wearable audio device,
wherein the control circuit is further configured to:
prompt the user to speak during the detecting of the first acoustic signal;
adjust a number of microphones for detecting an acoustic signal associated with the user's speech according to the settings in the demonstration mode;
detect the acoustic signal associated with the user's speech using the adjusted number of microphone;
process the acoustic signal associated with the user's speech to generate a voice signal; and
output the voice signal for playback to the user.

9. The wearable audio device of claim 8, further comprising:
a sensor system comprising a biometric sensor for generating the biometric signal indicating a biometric state of the user, wherein the control circuit prompts the user to initiate the demonstration mode based on the biometric signal from the biometric sensor.

10. The wearable audio device of claim 8, further comprising a sensor system comprising one or more microphones, wherein the one or more microphones is used to detect the first acoustic signal at the wearable audio device, and wherein processing the first acoustic signal according to the acoustic demonstration settings comprises modifying the number of microphones used to detect the first acoustic signal.

11. The wearable audio device of claim 8, wherein processing the first acoustic signal according to the acoustic demonstration settings comprises selecting a signal processing algorithm to apply to the first acoustic signal.

12. The wearable audio device of claim 8, wherein:
the demonstration mode comprises a controllable noise cancelling (CN) demonstration mode,
the detected acoustic signal comprises an ambient noise signal at the wearable audio device,
processing the ambient noise signal comprises apply a set of distinct CNC filters, in a sequence, to the ambient noise signal received at the wearable audio device, to generate processed ambient noise signals, and
outputting a second acoustic signal for playback at the wearable audio device comprises outputting the processed ambient noise signals.

13. The wearable audio device of claim 8, wherein:
the demonstration mode comprises a voice pickup demonstration mode,
the first acoustic signal detected at the wearable audio device comprises voice signals from the user of the wearable audio device,
processing the detected voice signals according to the acoustic demonstration settings comprises applying at least one filter to the voice signals to generate processed voice signals, and
outputting the second acoustic signal for playback at the wearable audio device comprises outputting the processed voice signals.

14. The wearable audio device of claim 13, wherein processing the detected voice signals according to the acoustic demonstration settings in the voice pickup demonstration mode comprises applying two distinct processing approaches to the detected voice signals, wherein the two distinct processing approaches comprise a first processing approach and a second processing approach, and outputting the second acoustic signal for playback at the wearable audio device comprises sequentially outputting acoustic signals processed using the first processing approach and acoustic signals processed using the second processing approach.

15. A computer-implemented method, comprising:
initiating a demonstration mode in a wearable audio device connected with a separate audio playback device, the initiating of the demonstration mode comprising:
sending instructions from the wearable audio device to the audio playback device to initiate playback of demonstration audio; and
prior to playback of the demonstration audio, disconnecting a previously established connection between the wearable audio device and the audio playback device;
initiating playback of the demonstration audio at the audio playback device after disconnecting from the wearable audio device;
detecting a first acoustic signal comprising the demonstration audio at the wearable audio device;
processing the first acoustic signal according to acoustic demonstration settings at the wearable audio device based upon the demonstration mode, wherein the processing generates a second acoustic signal;
outputting the second acoustic signal for playback at the wearable audio device; and
reconnecting the previously established connection between the wearable audio device and the audio playback device.

16. The computer-implemented method of claim 15, wherein the demonstration audio comprises simulated noise.

17. The computer-implemented method of claim 15, wherein processing the first acoustic signal comprises adjusting a number of microphones or a configuration of microphones used to detect the first acoustic signal.

18. The computer-implemented method of claim 15, further comprising:
prompting a user to speak during the playback of the demonstration audio; and
applying one or more filters to the first acoustic signal, wherein the one or more filters comprise specific frequency bands for voice signals so as to enhance or diminish effects of the user's speech on the playback at the wearable audio device.

19. The wearable audio device of claim 9, wherein the demonstration mode comprises an exercise coaching demonstration mode, wherein the control circuit prompts the user to initiate the exercise coaching demonstration mode in response to detecting the biometric state of the user is an exercise state.

20. A computer-implemented method, comprising:
detecting, using a sensor, at least one characteristic of an acoustic environment proximate a wearable audio device;

based on the at least one characteristic of the acoustic environment, prompting a user of the wearable audio device to initiate a demonstration mode for the wearable audio device, wherein the demonstration mode comprises a voice pick-up demonstration mode;

initiating the demonstration mode in the wearable audio device in response to user actuation of the prompt;

prompting the user to speak after initiating the demonstration mode;

detecting a first acoustic signal at the wearable audio device;

processing the first acoustic signal according to acoustic demonstration settings at the wearable audio device based upon the demonstration mode, wherein the processing generates a second acoustic signal, the processing comprising processing acoustic signals detected at the set of microphones, the acoustic signals including user voice signals and ambient noise signals; and outputting the second acoustic signal for playback at the wearable audio device the outputting of the second acoustic signal comprising outputting the processed acoustic signals to the user at the wearable audio device to demonstrate voice pickup functions of the wearable audio device.

21. The computer-implemented method of claim 20, wherein the sensor comprises a set of microphones, wherein the at least one characteristic comprises an ambient sound pressure level (SPL) proximate the wearable audio device that is above a threshold as detected by the set of microphones.

22. The computer-implemented method of claim 20, further comprising, during the voice pick-up demonstration mode: initiating audio playback of noise at different simulated noise levels at a separate audio playback device that is connected with the wearable audio device.

23. A wearable audio device comprising:
an acoustic transducer for providing audio playback to a user;
a communications module for establishing a connection with a separate audio playback device; and
a control circuit coupled with the acoustic transducer and the communications module, the control circuit configured to:
  initiate a demonstration mode in the wearable audio device;
  detect a first acoustic signal at the wearable audio device;
  detect a biometric signal about a user at the wearable audio device;
  process the first acoustic signal according to acoustic demonstration settings at the wearable audio device based upon the demonstration mode, wherein the acoustic demonstration settings are selected based upon the detected biometric signal, wherein the processing generates a second acoustic signal; and
  output the second acoustic signal for playback at the wearable audio device,
wherein the control circuit is further configured to:
  prompt the user to speak during the detecting of the first acoustic signal;
  adjust a signal processing algorithm used for detecting an acoustic signal associated with the user's speech, according to the settings in the demonstration mode;
  detect the acoustic signal associated with the user's speech;
  process the acoustic signal associated with the user's speech to generate a voice signal; and
  output the voice signal for playback to the user.

24. A wearable audio device comprising:
an acoustic transducer for providing audio playback to a user;
a communications module for establishing a connection with a separate audio playback device; and
a control circuit coupled with the acoustic transducer and the communications module, the control circuit configured to:
  initiate a demonstration mode in the wearable audio device;
  detect a first acoustic signal at the wearable audio device;
  detect a biometric signal about a user at the wearable audio device;
  process the first acoustic signal according to acoustic demonstration settings at the wearable audio device based upon the demonstration mode, wherein the acoustic demonstration settings are selected based upon the detected biometric signal, wherein the processing generates a second acoustic signal; and
  output the second acoustic signal for playback at the wearable audio device,
wherein:
  the demonstration mode comprises a voice pickup demonstration mode,
  the first acoustic signal detected at the wearable audio device comprises voice signals from the user of the wearable audio device,
  processing the detected voice signals according to the acoustic demonstration settings comprises applying at least one filter to the voice signals to generate processed voice signals, and
  outputting the second acoustic signal for playback at the wearable audio device comprises outputting the processed voice signals,
  wherein processing the detected voice signals according to the acoustic demonstration settings in the voice pickup demonstration mode comprises applying two distinct processing approaches to the detected voice signals, wherein the two distinct processing approaches comprise a first processing approach and a second processing approach, and outputting the second acoustic signal for playback at the wearable audio device comprises sequentially outputting acoustic signals processed using the first processing approach and acoustic signals processed using the second processing approach.

25. A wearable audio device comprising:
an acoustic transducer for providing audio playback to a user;
a communications module for establishing a connection with a separate audio playback device;
a control circuit coupled with the acoustic transducer and the communications module, the control circuit configured to:
  initiate a demonstration mode in the wearable audio device;
  detect a first acoustic signal at the wearable audio device;
  detect a biometric signal about a user at the wearable audio device;
  process the first acoustic signal according to acoustic demonstration settings at the wearable audio device based upon the demonstration mode, wherein the acoustic demonstration settings are selected based upon the detected biometric signal, wherein the processing generates a second acoustic signal; and
output the second acoustic signal for playback at the wearable audio device; and
a sensor system comprising a biometric sensor for generating the biometric signal indicating a biometric state of the user, wherein the control circuit prompts the user to initiate the demonstration mode based on the biometric signal from the biometric sensor,
wherein the demonstration mode comprises an exercise coaching demonstration mode, wherein the control circuit prompts the user to initiate the exercise coaching demonstration mode in response to detecting the biometric state of the user is an exercise state.

* * * * *